United States Patent
Huth et al.

(12) 
(10) Patent No.: US 6,704,742 B1
(45) Date of Patent: Mar. 9, 2004

(54) DATABASE MANAGEMENT METHOD AND APPARATUS

(75) Inventors: William A. Huth, Delafield, WI (US); Michael R. Blaha, Chesterfield, MO (US); John C. Ignasiak, New Berlin, WI (US); Steven A. Michals, Brookfield, WI (US); Tobin J. Schuster, Milwaukee, WI (US); Diana R. St. John, Germantown, WI (US)

(73) Assignee: Johnson Controls Technology Company, Plymouth, MI (US)

( * ) Notice: Subject to any disclaimer, the term of this patent is extended or adjusted under 35 U.S.C. 154(b) by 148 days.

(21) Appl. No.: 09/898,563

(22) Filed: Jul. 3, 2001

(51) Int. Cl.[7] .............................................. G06F 17/30
(52) U.S. Cl. ..................................................... 707/102
(58) Field of Search ................................ 707/1, 3, 6, 4, 707/10, 101, 102, 104.1, 203; 434/362; 709/212, 213, 216, 217

(56) References Cited

U.S. PATENT DOCUMENTS 5,852,819 A * 12/1998 Beller ............................ 707/1
6,405,207 B1 * 6/2002 Petculescu et al. ......... 707/102
6,513,032 B1 * 1/2003 Sutter ............................ 707/3

* cited by examiner

Primary Examiner—Diane D. Mizrahi
Assistant Examiner—Apu M Mofiz
(74) Attorney, Agent, or Firm—Foley & Lardner

(57) ABSTRACT

A method and apparatus for arranging and accessing database data in a manner such that massive amounts of data can be aggregated and manipulated in many different ways to generate reports of many different types in a rapid manner, the method including storing data in point slices where each slice includes data having similar attributes, receiving a report request from which data attributes corresponding to the data needed to instantiate the report can be gleaned, identifying at least one required point slice including the needed data, determining if the point slice exists, where the point slice does not exist, accessing other data and generating the point slice and perhaps some intervening point slices, storing the newly generated point slices and then using the required point slice to instantiate and provide the report.

87 Claims, 8 Drawing Sheets

Existing Point Slice Identifier

| Point Slice | Function | Unit | Interval | Time Stamp | Value |
|---|---|---|---|---|---|
| PS-1 | F-0001 | U-0022 | Hourly | T60 | V-1 |
|  |  |  |  | T120 | V-2 |
|  |  |  |  | T180 | V-3 |
|  |  |  |  | ... | ... |
|  |  |  |  | T12,000 | V-200 |
| PS-2 | F-0003 | U-0023 | Hourly | T60 | V-201 |
|  |  |  |  | T180 | V-ccc |
|  |  |  |  | ... | ... |
|  |  |  |  | T525,600 | V-ddd |
| PS-3 | F-0003 | U-0023 | Daily | T1440 | V-eee |
|  |  |  |  | ... | ... |
|  |  |  |  | T525,600 | V-fff |
| PS-4 | F-0003 | U-0023 | Monthly | T43,200... | V-ggg... |
|  |  |  |  | T-525,600 | V-hhh |
| PS-5 | F-0001 | U-0057 | Hourly | T60... | V-iii |
|  |  |  |  |  | ... |
|  |  |  |  | T-1800 | V-jjj |
| PS-6 | F-0001 | U-1009 | Hourly... |  |  |
| PS-7 | F-0002 | U-0003 | Hourly | T60 | V-kkk |
|  |  |  |  | T120 | V-lll |
| PS-8 | Null | U-0004 | Minute | T60 | V-ooo... |
|  |  |  |  | T525,600 | V-ppp |
| PS-L | Null | U-2011 | Minute | T1-Tinfinite | Vaaa-Vbbb |
| PS--M... |  |  |  |  |  |
| PS-N | F-0098 | U-0002 | Daily | T1440-T20,000 | Vnn-Vmmm |

Fig. 2

DATABASE MANAGEMENT METHOD AND APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The field of the invention is database management and more specifically methods and apparatus for automatically configuring a database as a function of the ways in which the data in the database is used.

While the present invention may be used in many different high information volume industries, in order to simplify this explanation, the invention will be described in the context of the building or enterprise automation (EA) industry. In addition, while the invention may be used with many different enterprises, the invention will be described in the context of an exemplary first enterprise owned by a first company and including seven separate campuses in different geographic regions where each campus includes a plurality of separate buildings and each building includes several thousand different environment condition sensors. Specifically, a first campus includes twenty separate buildings and each building includes two thousand separate sensors. In addition, it will be assumed that the first campus is in a location where the campus may receive its energy from either of three different utilities.

Moreover, separate sub-sections or parts of an enterprise will be referred to generally as units. For example, a sensor may be referred to as a unit. Similarly, a room (including many sensors), a floor of a building, a building, a campus, etc., may each be referred to as a unit. Other units may include a geographic area, a section of the enterprise related to a specific customer, a section of the enterprise serviced by a specific vendor, etc. Furthermore, while any of several different processors, work stations, etc. may perform the inventive functions, the invention will be described in the context of an exemplary system including a single database having a database processor and a single work station for accessing the database and manipulating data therein and also for receiving commands from a system administrator and providing reports and other data to the administrator. Here the station is used to interface with the processor and it will be assumed that the database processor performs essentially all data and database manipulation functions.

Furthermore, the term "data segment" will be used to refer to a subset of data values stored in a database where the sub-set may include anywhere from one to a theoretically infinite number of data values. In addition, while there are hundreds of functions that may be performed on data to generate data segment, unless indicated otherwise, the present invention will be described in the context of total and average power functions in order to simplify this explanation.

While there are many different costs associated with running any type of facility, recent energy shortages have made energy an ever increasingly important consideration in running many facilities. Fueled in part by increasing energy costs, facility administrators are now routinely charged with reducing energy, operating, and maintenance costs.

One way to reduce energy costs is to modify the ways in which energy is used in a facility and, where inefficiencies are identified, to modify the facility or energy use patterns to address the inefficiencies. For instance, in the case of the first campus described above, if off peak energy is delivered at a lower rate than on peak energy, first campus buildings may be cooled down in the morning during an off peak period prior to employees arriving to reduce energy costs. As another instance, cool air flow rate may be altered if a cooling system is more efficient than anticipated.

One other way to reduce energy costs is to identify errors in utility charges and receive credits. To this end, it is known that utilities monitor energy usage by collecting use data at periodic demand intervals. For instance, an exemplary demand interval may be every 15 minutes so that a utility collects a reading every 15 minutes. At the end of a billing cycle, the utility bases its energy charges on the demand interval readings. By measuring energy more regularly (e.g., every minute) and taking the average over the utility's demand cycle, it has been found that often the demand interval readings are higher than actual average energy usage over the demand interval period. When confronted with such information utilities have routinely given credits to customers. In many cases the credits have amounted to as much as several percent (e.g., 10%) of the total energy bill during some billing cycles.

Yet one other way to reduce energy costs is to "shop" for energy by comparing energy rates from various utilities in an area. Thus, for example, in the case of the first campus described above, the campus administrator may select an energy provider from any of the three different utilities in the area.

In addition to reducing energy costs, facility administrators are also routinely charged with reducing maintenance costs and increasing up time of facility equipment. In order to reduce maintenance costs equipment can be diagnostically monitored to estimate when preventive maintenance should be performed. To this end, by trending operating characteristics of facility equipment (e.g., an HVAC system) and comparing the trending results with known failure patterns for similar equipment, impending problems with the equipment can be identified and addressed.

While several ways to reduce operating and maintenance costs have been described above, there are many other ways to reduce costs that a facility administrator can choose from and the examples above are not meant to be exhaustive.

One common characteristic of each of the cost saving processes described above is that, for each process to be most effective, each process requires collection of facility operating data. For instance, in the case of modifying energy use patterns, massive amounts of data have to be collected in order to identify inefficient energy patterns and other enterprise inefficiencies. Similarly, in order to identify utility mis-charges, energy readings have to be gathered every minute for a facility. In the case of the company described above that has many buildings on many campuses, the information that must be gathered is enormous. In the case of maintenance trending the amount data to be collected is massive.

Even the seemingly simple task of shopping around for the best deal on energy costs requires facility data collection and analysis. At first blush one would think that the best deal on energy costs could be determined by simply comparing utility rates. Unfortunately, often rates are different during different times of day and during different times of year. Complicating matters further, facility energy use is often very different at different times of day and different times of year. Thus, to determine the most cost effective utility form which to purchase power, historical energy use rates and times have to be collected and used as a proverbial "glimpse" into the future. For instance, knowing energy use patterns over a previous year period, an administrator can apply different utility rate schedules for the coming year to determine likely cost per utility and then select the least expensive option for a facility or enterprise.

Thus, the EA industry is not unlike other industries where, over the last several decades, computer workstations and related electronic devices have evolved to the point where they are now useful and, in many cases indispensable, tools needed for running businesses. Workstations and related devices have made it possible to collect massive amounts of information in a fraction of the time that would be required without the use of such tools.

Despite advancements in database management, related technological advances such as inexpensive sensors, standard network protocols (i.e., RMON, SNMP, etc.) and the ability to quickly and relatively inexpensively network data collecting devices together have, in some cases, rendered even relatively fast databases essentially unable to provide desired information crunching capabilities in an affordable product. For example, in the EA industry and, again considering the first campus described above, data may be collected every minute from each of thousands of environment condition sensors throughout the first campus and that data may be collected over the course of several years. For instance, a building chiller mounted on the top of a building may have four different sensors including an inlet temperature sensor, an inlet pressure sensor, a discharge temperature sensor and a discharge pressure sensor. As another instance, temperature, pressure, humidity and air flow sensors may be placed in each room within each building on the first campus for measuring respective parameters.

In this case, it may be advantageous to examine the raw data collected by the separate sensors. More likely, however, a system administrator may want to examine some aggregate of the collected data such as the average temperature in a room over an interval (e.g., a 15 minute interval) or the average temperature over 15 minute intervals over the course of a 12 month period. Another likely interesting data aggregate may include power consumption in a particular building on a daily basis over the course of a sixty month period so that any power spikes can be identified and their causes determined. Yet another likely interesting data aggregate may be to examine the power consumption for two similar buildings and compare consumption between the two buildings. Many other requests are contemplated.

While there are many interesting data aggregates or segments, even with relatively fast computers or work stations, combining raw data together to generate the interesting data segments is time consuming. For instance, combining raw data that has minute intervals over the course of several years to generate total energy consumption for the exemplary company described above would likely take more time (e.g., perhaps on the order of tens of minutes) than a system administrator is willing to wait. This is particularly true in comparative situations where many such requests may be needed to generate the comparative information as, for instance, where such energy consumption for each year over a ten year period is to be compared.

Where only a small number of data segments are required routinely, such processing periods may be tolerable. Unfortunately, in most cases, system administrators would prefer to access data segments that slice and dice data in many different ways and in these cases, because of the multiplicity of ways in which the data must be viewed in a finite data analysis period, long waiting periods cannot be tolerated.

One solution to this problem has been to specify specific report types to be supported by a system and then effectively program database functions (e.g., roll ups, etc.) that generate data segments that are needed to provide the supported reports when the information required to generate the segments becomes available. Then, when an administrator requests a particular report, the database processor simply accesses the data segments needed to instantiate the report and generates the report. In effect each pre-calculated data segment is a cache of useful information that will be used at subsequent times to generate reports of one or more different types.

While pre-calculated data segments and caching have streamlined the report generating process, such data manipulation techniques have several short comings. First, configuring database functions is extremely time consuming and has to be performed by an experienced database programmer. Prior to a system administrator using a database, a database programmer has to specify virtually every aspect of each system supported function. General function aspects include the raw data to be combined to form the data segment (i.e., the units or sensors from which to collect data), the actual combining function steps (e.g., total energy consumption, average temperature, etc.), the units of measure for the function result and the interval over which the function should be applied. In addition, the programmer has to specify where within the database the data segment will be stored so that subsequent access can be expedited. Typically this step of specifying database location required modifying the structure of the database by specifying a new database table specifically earmarked to receive the new data segments.

Not surprisingly, the time required to specify supported functions is directly related to the number of functions to be supported. In the case of a large enterprise there are virtually millions of ways in which raw data can be combined and parsed. For instance, data can be parsed on a sensor by sensor (i.e., where the unit is a sensor) basis over various interval/function combinations, on a room by room basis over various interval/function combinations, on a building by building basis over various interval/function combinations, on a campus by campus basis over various interval/function combinations, on an enterprise wide basis over various interval/function combinations, by selecting specific buildings having similar characteristics from each of the campuses over various interval/function combinations, by selecting specific sensors having similar characteristics from all campuses, etc. In these cases a different function or segment for each unit-intervalfunction combination would have to be specified.

Second, the effectiveness of pre-canned data segments in speeding up data processing is user dependent. In fact, in many cases, pre-canned data segment roll ups may not appreciably speed up data manipulation at all. To this end, while a programmer can identify certain generally useful data segments, there is no way for the programmer to anticipate which data segments will be most useful to a particular administrator and therefore, in many case, certain data segments may only rarely be employed. For instance, where a pre-canned data segments includes total monthly energy consumption for each building on each campus but an administrator wants consumption on a weekly basis for each building, either the system will not allow the administrator to generate weekly data segments or the database processor will have to be programmed to revert back to combining the raw data when the request is entered, a task that could take several minutes to complete.

Third, repetitive requests for data segments that are not supported by pre-canned segments result in repetitive processing and waiting periods that are burdensome to system administrators. To this end, assuming that a data segment is requested that is not pre-canned, upon receiving the request, the database processor performs a first process including accessing the raw data, combining the data and providing the requested segment. This first process may take several minutes. Some time thereafter (e.g., the next day), the administrator may again want to access data similar to that accessed pursuant to the first process but updated to include data from the intervening time period. In this case, when a second process request is again received, the database processor responds to the second request by accessing the raw data, combining the data and providing the requested segment. The time required to facilitate this second process would be slightly longer than the time required to perform the first process, the additional time needed to accommodate the data corresponding to the intervening time. Thus, in many cases, another several minute wait would be necessary to generate the requested data segment. Clearly this repetitive computing requirement exacerbates the data review process.

In a case where data is manipulated in a similar fashion repetitively and routinely, one solution is to have the programmer reconfigure the database to support additional useful data segments. While possible, manual database reconfiguration is cumbersome and would be very difficult to administer for several reasons. First, administrators likely would not be familiar with the ways in which data segments could be configured. To this end many administrators are not technically savvy and therefore would never inquire as to segment pre-canning capabilities.

Second, most companies do not have programmers on staff to reconfigure databases to accommodate administrative requirements on the fly. Instead, separate database consultants are often used to customize segments and other reporting features which adds costs to the system as a whole.

Third, given the costs and troubles associated with reconfiguring a database to support additional segmentation, it may not be clear to an administrator when reconfiguration is warranted. For instance, what if similar data segments are required only every six months and each time the particular segment is generated only 10 minutes are required. Would these circumstances warrant modification?

While the problems described above exist on a facility by facility basis, the problems are exacerbated where many facilities are managed by a single administrator. For instance, recently, a remote facility monitoring industry has evolved wherein industry members provide remote monitoring services to clients. In these cases, a provider may provide services to several hundreds or even thousands of facilities in many geographic locations. In this case data from literally millions of sensors would have to be collected, archived and manipulated.

Thus, there clearly is a need for a database and a method for manipulating the database where database query results can be quickly determined without requiring massive amounts of manual programming.

BRIEF SUMMARY OF THE INVENTION

It has been recognized that a database can be configured that effectively "learns" during use and generates and stores data segments that are routinely used thereby reducing the time required to generate subsequently requested reports that include the data segments. Thus, according to one embodiment of the invention, when a report is requested via a work station, a data segment is needed to instantiate the report and the data segment is not already stored in a database, a database processor generates the requested data segment, stores the data segment for subsequent use and then provides the data segment in a report to the requesting user. Thereafter, when a subsequent report request requires a data segment similar to the newly stored data segment, if possible, the database processor employs the existing data segment and adds additional information to the data segment if necessary, to provide the similar segment.

In addition, in at least some inventive embodiments, when a request causes the database processor to combine data segments to create a new data segment, in addition to generating and storing the new data segment, the processor also causes intervening data segments to be generated and stored for subsequent use. For instance, assume that power consumption data is generated and stored as raw data every minute for every building owned by a particular company. In addition, assume that an administrator requests a report comprising data segments for a first period including the last sixty months (i.e., last five years) for each building showing monthly total energy consumption for each building. In this case, the database processor may begin by rolling the minute data into fifteen minute intervals and storing the fifteen minute interval data segments as intermediate data segments. Next, the processor may roll up the fifteen minute data segments to hourly data segments and then the hourly to daily, and the daily to monthly, the processor storing each of the intermediate roll-up data segments for subsequent use.

Thereafter, the sub-period data that has been rolled up corresponding to the 15 minute, hour and day intervals can be used subsequently to instantiate other requested reports to speed the process of data delivery to the administrator. Thus, if, after viewing the monthly power consumption information, the administrator wishes to view daily power consumption information corresponding to at least a portion of the first period (i.e., a sub-period of the last sixty months), the processor can quickly provide the desired information as the daily power consumption information has already been determined and stored in the database.

As another example, assume that an administrator requests average daily power consumption data for the entire first campus described above for each month during the course of a ten year period. In this case raw power consumption data over the course of each month is rolled up for the entire campus and the daily averages for the requested months are determined by dividing the rolled up values by the numbers of days in corresponding months. In addition, during the roll up process, the total energy consumption for each building for each of several sub-intervals may be rolled up as separate data segments and stored. For instance, the power for a first building may be rolled up by the minute, the hour, the day and the month, each of these roll ups stored as a separate data segment. In addition, the total power for each floor in each building for each of the sub-intervals may also be rolled up and stored. Moreover, the power for each piece of equipment for each floor in each building for each of the several intervals may be rolled into a data segment and stored. Furthermore, while the average daily power is desired, to obtain the average, the total power for the entire month must first be calculated and then the total divided by the number of days in the month. Thus, the total power per each interval per each separate unit (e.g., sensor, floor, building, campus, etc.) may also be stored as a separate data segment for subsequent use.

It should be appreciated that, while the initial process of generating rolled up data segments or data segments corresponding to more complex functions according to this inventive method has performance characteristics that are similar to the those obtainable via previous database management solutions, subsequent data requests requiring a subset of data corresponding to previously determined roll-ups and solved functions are expedited.

It should also be appreciated that the time required to acquire and store intermediate roll ups, even when not required for a particular request, is minimal and, therefore, the added benefits of acquiring and storing the intermediate roll ups are reaped without much computing overhead. To this end, the intermediate data segments are determined, as the term "intermediate" implies, as intermediate results required to generate requested data and therefore the only additional computing costs required to acquire and store the intermediate data segments are simply periodic data storage routines.

In addition, the present invention provides a system that requires no pre-canned roll ups. Instead, the system learns which roll ups may be useful in the future from previous use.

Moreover, the effectiveness of generated roll ups "on the fly" over pre-canned roll ups is increased as the roll ups that are generated are a function of administrative activity. Thus only roll ups requested by an administrator or intermediate roll ups related thereto are generated and stored. Because administrators typically become comfortable over time viewing certain types of reports with known characteristics, the likelihood of a particular administrator requesting a report that requires a previously requested roll up is greater than the likelihood of requesting a report that requires some new roll up. Similarly, even where an administrator's request requires a roll up not previously required to instantiate a report, the likelihood of the new roll up having similar characteristics to a previously required roll up is higher than the likelihood of the new roll up having unique characteristics and therefore there is a good chance that the new roll up will correspond to a previously generated and stored intermediate roll up. For instance, assume an administrator requests and views monthly average energy consumption over several years for an entire enterprise and notices a spike in a particular month. A next logical report request may be to view daily average energy consumption for the particular month, for the entire enterprise. As described above, according to one aspect of the invention, an intermediate roll up generated and stored while the average monthly energy consumption roll up was being generated would be average daily energy consumption for the enterprise and therefore the data segment needed to instantiate the next request would already be present and could be used to rapidly (e.g., effectively in real time) generate the report.

The invention also includes a database concept referred to as a "point slice" that helps organize a complex dynamic database and facilitates dynamic data storage. To this end, it has been recognized that virtually any data sub-set in a database can be completely characterized by a relatively small number of data attributes. For example, in the case of enterprise automation systems (i.e., building automation), any data segment (i.e., data subset) can be completely characterized by unit, function, interval and time period attributes where the unit attribute corresponds to a particular sub-grouping of hardware associated with (e.g., generating raw data needed to generate the data subset) the segment, the function attribute corresponds to a function (e.g., a roll-up, an average, a more complex calculation, etc.) performed on some data to generate the data segment, the time period attribute corresponds to the period over which the data in the segment is collected and the interval attribute corresponds to the durations of sub-periods during the time period over which the function is applied to generate data values in the data segment. For instance, a first point slice may correspond to a single power consumption monitor (i.e., the unit is the monitor) for which raw power consumption data is to be rolled up (i.e., the function is to add up consumption readings) to generate monthly total consumption values (i.e., the interval is monthly) for the 60 month period beginning Jan. 1, 1996 and ending Dec. 31, 2000 (i.e., the period is Jan. 1, 1996–Dec. 31, 2000). As another instance, a second point slice may correspond to total energy consumption (i.e., function is total energy consumption) throughout the exemplary first enterprise described above (i.e., the unit is the entire enterprise) having a time period of three years and over the course of monthly intervals. One other instance may include a third point slice corresponding to a single power consumption monitor (i.e., the unit is the monitor) for which a single power consumption reading is to be stored (i.e., the function is simply "null"), where the interval is a minute and the time period is continuous meaning that raw data values are to be stored.

Thus, consistent with the point slice concept, every data segment (i.e., data subset) is stored as a unique point slice characterized by the minimum number of attributes required to uniquely identify the segment. In addition to providing data that is easy to reference by storing all segments as point slices, the present invention enables all segments to be stored in a single simple database capable of supporting theoretically an infinite number of different roll ups and data segments without requiring modifications to the database structure. Thus, for instance, where a request requires a new roll up that was not previously generated and stored, after the roll up is generated, the roll up is stored as a point slice according to unit, function, time period and interval in a single data base structure (e.g., a table).

In summary, in at least one embodiment, a point slice includes a data segment correlated with segment attributes that uniquely distinguish the particular segment from all other segments.

The invention also includes a method to be used with a database and an interface, the interface for specifying reports to be generated, the database capable of including a hierarchy of point slices where each point slice includes a data segment and at least a subset of the data segments can be combined to instantiate each specified report, the method for expediting the report generating process and comprising the steps of (a) receiving a report request; (b) identifying at least one required point slice required to instantiate the report; (c) searching the database for the at least one required point slice; (d) where the at least one required point slice does not exist, identifying an intermediate subset that includes intermediate point slices required to generate the at least one required point slice; (e) determining if the intermediate subset point slices exist; (f) for each non-existent intermediate subset point slice, using existing point slices to generate the non-existent intermediate point slice; (g) combining the intermediate subset point slices to generate the at least one required point slice; and (h) instantiating the report using the at least one required point slice.

In some embodiments the method further includes the step of, after generating the non-existent required point slice, storing the generated required point slice for use when subsequent reports are requested. In other embodiments the method further includes the step of, after generating the non-existent intermediate subset point slices, storing the generated intermediate subset point slices for use when subsequent reports are requested.

In one aspect the step of using the existing segments to generate the non-existent intermediate subset point slices includes, for each non-existent intermediate subset point slice, repeating steps (c) through (g) with the intermediate point slice as the required point slice to determine the intermediate point slice. In another aspect at least a subset of the generated intermediate subset point slices are stored for subsequent use. In some cases every generated intermediate subset point slice is stored for subsequent use.

The step of identifying at least one required point slice needed to instantiate the report may include receiving a report request and parsing the report request to identify the at least one point slice. The method may be for use in an enterprise automation system including at least one unit, the unit including at least one data source element and wherein each point slice includes data corresponding to a specific function, a specific period and specific intervals within the period for a specific unit and wherein the step of receiving includes receiving an indication of a particular unit, a time period for which to report data corresponding to the unit, an interval and a function to be performed on data corresponding to the unit, the step of identifying including identifying a point slice corresponding to the specified unit, function, time period and interval.

The step of identifying may further include identifying relevant data types required to perform the specified function, identifying relevant unit source elements that provide the relevant data types and identifying relevant point slices corresponding to the relevant units, interval, time period and function. Here the step of combining the point slices may include combining data segments corresponding to the relevant units according to the specified function.

The invention further includes a method to be used with a database and an interface, the interface for specifying reports to be generated, the database capable of storing a hierarchy of points slices where each point slice corresponds to a data segment and where a subset of the data segments can be combined to instantiate each specified report, the method for automatically modifying a database structure as a function of specified reports to speed subsequent report generation and comprising the steps of: (a) receiving a report request; (b) identifying at least one required point slice needed to instantiate the report; (c) searching the database for the at least one required point slice; (d) where the at least one required point slice does not exist, identifying an intermediate subset that includes intermediate point slices required to generate the at least one required point slice; (e) determining if the intermediate subset point slices exist; (f) for each non-existent intermediate subset point slice, using existing point slices to generate the non-existent intermediate subset point slice; (g) combining the intermediate subset point slices to generate the at least one required point slice; and (h) storing the at least one required point slice.

The step of using the existing point slices to generate the nonexisting intermediate subset point slices may include, for each non-existent intermediate subset point slice, repeating steps (c) through (g) with the intermediate point slice as the required point slice to determine the intermediate point slice. The method may further include storing every generated point slice for subsequent use.

The invention also includes a method for use with a processor, an interface and a plurality of source elements, the interface for specifying report requests, each report request including request information that can be used to identify point slices and corresponding data values where a sub-set of the data values are needed to instantiate each report, the source elements periodically generating raw data values and providing the raw data values to the processor, the processor for receiving data values and report requests, combining the data values to generate combined data values as a function of the report requests and storing the data values in corresponding point slices for subsequent use in generating subsequent reports pursuant to subsequent requests and generating reports using the data values, the database comprising: an existing point slice identifier identifying existing point slices; and a point slice specifier indicating how to combine existing data values to generate non-existing data values and corresponding point slices.

Each combined data value may include data from more than one source element and each point slice is characterized by unit, period, interval and function attributes, the unit attribute indicating the source elements that produce signals used to generate the data values, the period attribute indicating a period to which the slice corresponds, the interval attribute indicating a duration between data values in the point slice and the function attribute indicating a function applied to at least one of source element signals and data values to generate the data values in the point slice, the existing point slice identifier indicating each of the function, unit, interval and period corresponding to each existing point slice.

Each request may include a unit attribute and wherein the specifier, for at least some of the units, indicates sub-units that comprise the units. Each request may include a function attribute and wherein the specifier, for at least some of the functions, indicates sub-functions that comprise the functions. Each request may include a period attribute and wherein the specifier, for at least some of the periods, indicates sub-periods that comprise the periods. Each request may include an interval attribute and wherein the specifier, for at least some of the intervals, indicates sub-intervals that comprise the intervals.

The method may be for use in managing a building automation system wherein the unit attribute is selected from one of a customer unit, a supplier unit, a geographic region unit, a person unit, a campus unit, a building unit, a floor unit and an equipment unit.

The method may be for use in managing a building automation system and the interval attribute may be selected from one of a yearly interval, a quarterly interval, a monthly interval, a daily interval, an hourly interval and a minute by minute interval.

For at least some point slices, the specifier may indicate other point slices to be manipulated according to a function to generate a requested point slice. Each request also may include a unit attribute and the point slice specifier correlates the unit attributes with specific sub-sets of source elements.

Moreover, the invention includes a method to be used with a database where a plurality of data segments are stored in the database, at least some of the data segments correlated with point slices in the database, the method for expediting the process of accessing combinations of the data segments upon request and comprising the steps of: receiving a report request; identifying at least one required point slice required to instantiate the requested report; if the at least one required point slice does not exist, identifying intermediate point slices that can be combined to provide the required point slice; combining the intermediate point slices to generate the required point slice; during the step of combining the intermediate point slices, determining if the combining process generates intermediate point slices that may be useful during subsequent requests; and where there are useful intermediate point slices, storing the useful intermediate point slices for subsequent use.

Here the method may further include the step of storing the generated required point slice.

The report request may include a function attribute specifying a function to be performed to generate the data segment corresponding to a point slice needed to instantiate the requested report and the function may include at least one sub-function, the combining step including solving the sub-function and the step of determining including identifying the data segment and intermediate point slice corresponding to the solution of the sub-function.

The report request may include a unit attribute specifying source elements from which data segments are to be combined to generate the point slice needed to instantiate the requested report and wherein the unit includes at least two sub-units, the combining step including combining the data elements for each of the two sub-units separately and the step of determining including identifying the data segments and intermediate point slices corresponding to each of the two sub-units.

The report request may include an interval attribute specifying an interval over which data segments are to be combined to generate the point slice needed to instantiate the requested report and wherein the interval includes at least first and second sub-intervals, the combining step including combining the data segments foe each of the first and second sub-intervals separately and the step of determining including identifying the data segments and intermediate point slices corresponding to each of the first and second sub-intervals.

Furthermore, the invention includes a method to be used with a database where a plurality of data segments are stored in the database, at least some of the data segments correlated with point slices in the database, the method for expediting the process of accessing combinations of the data segments upon request and comprising the steps of: receiving a report request including a first time period over which data having a first set of attributes is needed to instantiate the requested report; determining if there is an existing first point slice having the first set of attributes over a second time period where the first time period includes at least a time segment in addition to the second time period; where the first point slice exists, generating a second point slice having the first set of attributes and including data corresponding to a new period including the first and second periods and any intervening period.

Here the method may further include the step of storing the second point slice. The method may further include the step of deleting the first point slice and the step of using the second point slice data values to instantiate the requested report. Moreover, the method may include the step of presenting the instantiated report to a requesting system user.

The invention further includes a database construct for storing data values corresponding to specific source elements, the construct comprising: a plurality of point slices wherein each point slice includes at least one data value, each slice correlated with unit, function, interval and time period attributes, the unit attribute indicating the source elements that produce raw data used to generate corresponding point slice data values, the period attribute indicating a period to which the slice corresponds, the interval attribute indicating a duration between data values in the point slice and the function attribute indicating a function applied to data values to generate the point slice data values.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 2 is a schematic diagram of an existing point slice identifier according to the present invention;

DETAILED DESCRIPTION OF THE INVENTION

Figure 1:
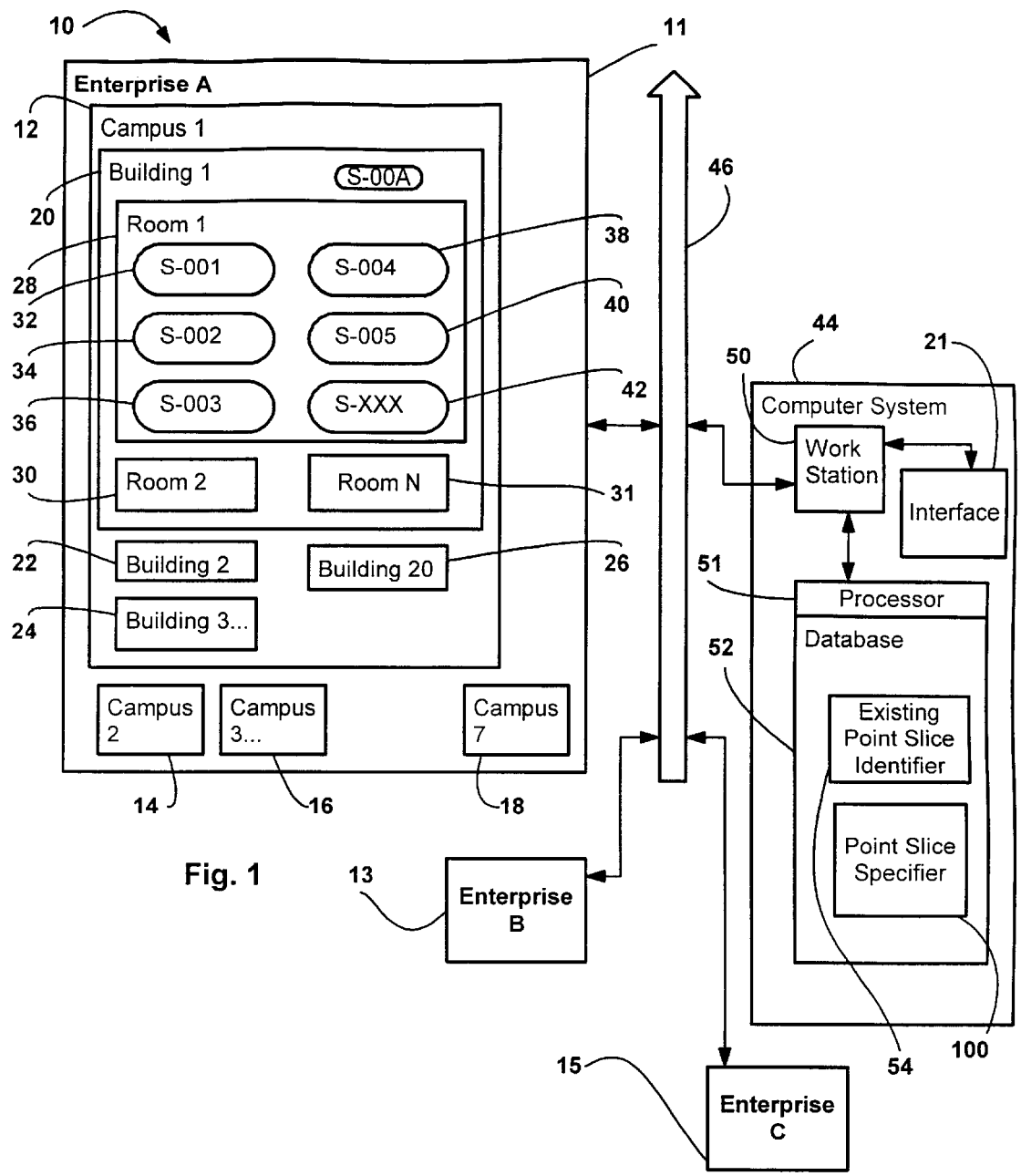
FIG. 1 is a schematic diagram of an enterprise control system that operates in accordance with the present invention.

Referring now to the drawings wherein like reference characters represent similar elements throughout the several views and, more specifically, referring to FIG. 1, the present invention will be described in the context of an exemplary enterprise automation system 10 including first, second and third enterprises 11, 13, and 15 (also referred to as enterprise A, enterprise B and enterprise C, respectively), a computer network 46 and a computer system 44. Each of enterprises 11, 13 and 15 has a similar construction, similar operation and similar components and therefore, only enterprise 11 will be described here in any detail.

Referring still to FIG. 1, enterprise 11 includes all of the hardware owned by the first company described above that includes data sources (i.e., source elements such as sensors, user terminals, etc.) that provide data to be stored on a database in computer system 44. To this end, consistent with the exemplary enterprise described above, first enterprise 11 includes seven different campuses 12,14,16,18, etc. Each of campuses 12,14, 16 and 18 includes similar components and operates in a similar fashion and therefore only first campus 12 is described here in order to simplify this explanation.

First campus 12 includes twenty separate buildings 20, 22, 24, 26, etc., each of the buildings including similar components and operating in a similar fashion with respect to the present invention. For this reason, only building 20 will be described here in detail. Building 20 includes a plurality of similar rooms 28, 30, 31, etc. Room 28 includes a plurality of source elements 32, 34, 36, 38, 40, 42, etc. Each source element (e.g., 32) senses some condition within room 28, senses some hardware setting (e.g., a damper setting), senses some other operating condition within the corresponding room. Each of the other rooms (e.g., 30) in building 20 also includes a plurality of data sources or sensors that provide data for storage and examination. Data generated by source elements is referred to generally as raw data, or raw data values while raw data that is combined in any way or consistent with any function is referred to as combined data or combined data values. For instance, raw power consumption data generated every minute from a power consumption sensor may be one type of raw data while a roll up of the minute-by minute data that combines the data over the course of an hour would constitute a combined data value.

In addition to equipment type sensors, other such elements may include computers or workstations that allow persons associated with enterprise 11 to enter information regarding observations related to enterprise 11. Each of the source elements (e.g., 32, 34, etc.) periodically samples whatever condition or characteristic the element is monitoring and provides the sample or raw data value to network 46. For example, sensor 32 may sense the temperature within room 28 every minute and provide the raw temperature value to network 46. In the case of user provided information, instead of periodically obtaining such information, in one embodiment, upon entry, that information would immediately be provided to network 46 for storage.

Network 46 can be any type of computer based network that includes switches, routers and gateways for transferring data back and forth among electronic devices. For instance, network 46 may be a wide area network (WAN), a local area network (LAN), an intranet of some other type, the Internet, etc. In the case of the present invention, network 46 is linked to each of the source elements in each of enterprises 11, 13, 15, 17, etc., receives data therefrom and provides the received data to computer system 44. Although not necessary for the purposes of the present invention, network 46 may also be usable to send data from computer system 44 to control devices within each of the enterprises 11, 13, etc., so that system 44 can be used for controlling as well as monitoring and reporting purposes. Any networking protocol may be employed to communicate between enterprise 11 and system 44.

Computer system 44 is linked to network 46 and, as indicated above, receives source element data therefrom. System 44 is shown in a simplified form for the purposes of simplifying this explanation and, to this end, includes a single work station 50, a single database 52, a database processor 51 and an interface 21. Interface 21 is preferably a graphical user interface (GUI) useable by a system administrator to provide information to system 44 regarding reports to view and for providing visual representations of the reports. While various reporting software may be employed, preferred software may take a form similar to a standard network browser that provides hypertext markup language (HTML) documents for viewing.

Workstation 50 can be any standard type workstation having a processor and some dedicated memory for running computer programs. Interface 21 is linked to station 50 for two-way communication. Database processor 51 is linked to workstation 50 and receives queries therefrom regarding requested reports. When a query is received, database processor 51 uses information therein to access data stored in database 52.

Referring still to FIG. 1, while station 50 and database 52 are described as being part of a single computer system, it should be appreciated that station 50 and database 52 may in fact be linked via network 46 or some other computer based network so that database 52 is remotely located.

Figure 3:
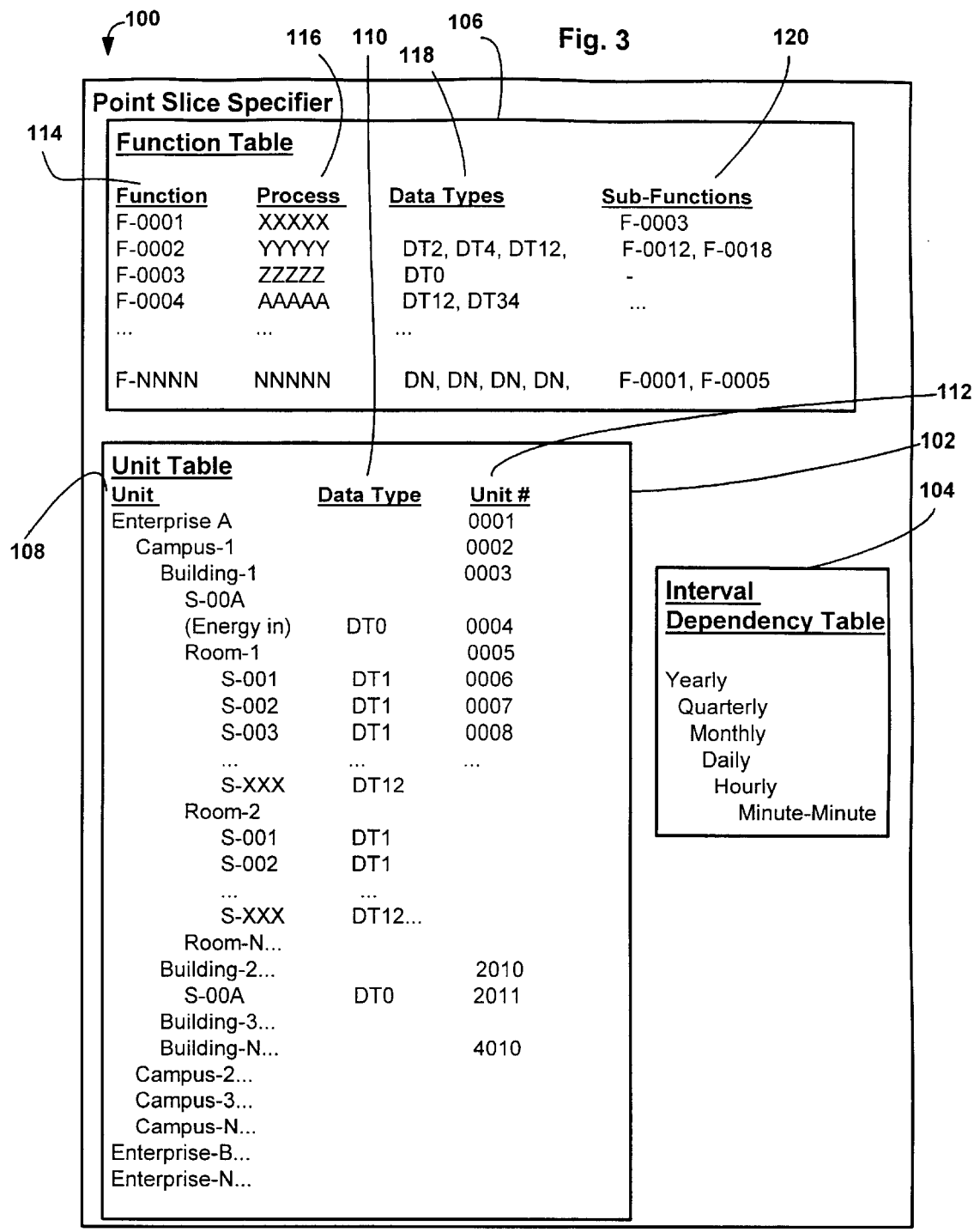
FIG. 3 is a schematic diagram of a point slice specifier according to the present invention.

Referring now to FIGS. 1, 2 and 3, database 52 includes two general database constructs including an existing point slice identifier 54 and a point slice specifier 100. Generally, as its name implies, the existing point slice identifier 54 indicates existing point slices (i.e., data segments including one or more data values (either raw or combined) correlated with segment attributes) that are already stored within database 52 while the slice specifier 100, as its name implies, indicates how non-existing point slices can be constructed using existing point slices.

Prior to describing identifier 54 and specifier 100, it is useful to define several terms to be used throughout the remainder of this specification. First, the term "value" is used to refer to a data value stored or to be stored within database 52. A value may comprise either a raw data value provided by a source element (e.g., element S-00A) or some calculated or combined value such as a rolled up power consumption value, a power average value, etc. The term "data segment" is used to refer to a set of data values corresponding to a specific point slice. For instance, a particular point slice may include several thousand data values corresponding to total energy consumption in a specific building, each value corresponding to a specific day and all of the values together corresponding to a specific time period. For example, 3,650 values in this time slice would correspond to a ten year period.

Second, referring again to FIG. 1, the source elements (e.g., 32, 34, etc.) may be divided into various element subsets based on similar characteristics.

For instance, all sensors within room 28 may comprise a first subset of sensors while all sensors within room 30 may comprise a second subset of sensors. Similarly, all sensors within building I may comprise a third subset of sensors including all of the sensors in rooms 28 and 30 and therefore including all of the sensors in the first two subsets described above. Similarly, all of the sensors associated with each of the campuses 12, 14, 16, 18, etc., may comprise yet another sensor subsets. For the purposes of this explanation, separate source element subsets will be referred to as units. For instance, all the sensors associated with enterprise 11 will be referred to as unit U-0001, all of the sensors associated with first campus 12 will be referred to as unit U-0002, all sensors associated with building 20 on first campus 12 will be referred to as unit U-0003 and so on. The smallest unit is a single source element (e.g., a sensor). For instance, power consumption sensor S-00A in FIG. 1 would be a unit including a subset of one source element.

Third, the term "function" is used to refer to any manipulation of data collected from enterprise sensors. For example, where sensor element S-00A (see FIG. 1) is measuring power consumption by building 20 (i.e., power delivered thereto), and provides a sensed value every minute, power consumption data over the course of intervals longer than one minute may be rolled up so that power used over the course of the longer periods can be observed. In this case, one function may be to add up each of the periodic power consumption values and generate a total energy consumption value. Another exemplary useful data aggregate may be to provide the daily average power per hour throughout the course of a year so that a system administrator can determine peak power consumption times and other times when relatively little power is used. In this case, the function would be to roll up the total energy consumption over the course of each day and divide each daily value by 24 hours to generate the average hourly consumption values.

Other much more complicated functions are contemplated by the present invention, more complex functions typically being the result of combining sub-functions. The simplest function is referred to as a "null" function meaning that no data manipulation occurs, data related to a null function simply being used or stored as raw data. For instance, where sensor S-00A provides raw power consumption values by the minute, a null function related thereto is simply to store the raw data.

Fourth, the term "interval" is used to identify the interval over which a particular function should be applied. For example, with respect to the exemplary power consumption roll up described above, the roll up may be processed over the course of an hour, a day, a month, a quarter of a year, a year and other periodic breakdowns. As another example, average hourly power consumption may be determined on a minute-by-minute basis, hourly, daily, monthly, quarterly, yearly, etc.

Fifth, the phrase "time stamp" refers to the time to which a particular data value corresponds. For instance, in the case of a sensor that provides a data value every minute, each value would be given a separate time stamp corresponding to the instant at which the value is generated.

A time stamp and interval together specify a specific period in time that proceeds the time stamp. For instance, where a time stamp indicates Dec. 31, 2000 and an interval attribute corresponds to a month, the combined interval and time stamp specify the month of December in the year 2000. As another instance, where a time stamp indicates the 200$^{th}$ minute on Feb. 2, 2001 and the interval attribute corresponds to a minute, the combined interval and time stamp specify the 199$^{th}$ minute on Feb. 2, 2000.

Sixth, the phrase "time period" is used to refer to a period of consecutive intervals over which a function has been or is to be applied to data to generate a separate data value for each interval. For instance, where minute interval power consumption values for building 20 have been stored over the course of the period between Jan. 1, 2000 and Dec. 31, 2000, the time period is Jan. 1, 2000 through Dec. 31 2000. As another instance, where average hourly power consumption for daily intervals is to be provided for a separate five year period the time period corresponds to the five year period.

Seventh, as described above, the phrase "point slice" is used to refer to unique combinations of unit, function, interval and time period and corresponding data values.

In its simplest form, a separate point slice is provided for each source element (e.g., sensor) within enterprise 11. For instance, referring again to FIG. 1, power consumption meter S-00A provides a power consumption value to processor 51 every minute. When received, processor 51 stores the power consumption value as part of a point slice corresponding to specific source element S-00A. In this case, as indicated above, because the raw data need not be manipulated prior to storage, the function is said to be null meaning that the raw data is simply stored. The unit in this case is the specific source element (i.e., sensor S-00A). The interval is "minute" meaning the raw data value is stored every minute.

The time period begins at the time when the first raw data value is provided by element S-00A and continues until the most recently stored raw data value from element S-00A.

In the case of raw data storage, a corresponding point slice is dynamic as the end of the point slice time period is modified each time a new raw data value is generated. For instance, where a source element generates a raw data value every minute, a new data value is stored every minute with a new time stamp. Thus, because there are 525,600 minutes in a year, each point slice used to store raw data values will include 525,600 time stamped values for each year of data collection.

More complex point slices include more complex functions. For instance, in the case of any average power function, power consumption values are rolled up over specified intervals for specified units and then divided by the number of hours in the roll-up period to generate the average consumption values in watts/hour. The average values are then stored along with interval time stamps within corresponding point slice. Thus, where the time period corresponding to an average power function over monthly intervals for a particular unit is one year, the resulting point slice has twelve separately time stamped entries, a separate entry time stamped for each month.

While the point slice concept described above is relatively simple, by treating all data values (e.g., raw data, roll ups, calculated values, etc.) in a similar fashion and indexing the values in a similar way (i.e., via a small set of attributes required to identify the data values therein), the end result is a database that facilitates relatively fast data manipulation and presentation as will be explained in more detail below.

Referring again to FIGS. 1 and 2, the existing point slice table 54 specifies existing point slices corresponding to data currently stored in database 52. To this end, slice table 54 includes a point slice column 68, a function column 56, a unit column 58, an interval column 60, a time stamp column 62 and a value column 63. Unique point slices PS-1, PS-2, PS-3, etc. are listed in column 68. Functions are listed in function column 56 including functions F-0001, F-0002, F-0003, etc. As indicated above, each function indicates a particular way of manipulating data received from source elements or for manipulating other point slice data. As indicated above, while many functions are contemplated, the present invention will be described in the context of a total energy consumption function and an average power function. Hereinafter it will be assumed that function F-0001 is the average power function in Kwatts while function F-0003 is the total energy consumption function in Kwatt-hours.

Unit column 58 lists units that correspond to slices in column 68. For example, according to first point slice PS-1, average power function F-0001 has been applied to a unit U-0002. In the present example, it is assumed that unit U0002 corresponds to first campus 12 (see FIG. 1). Other units to which average power function F-0001 has been applied include unit U-0057 (see point slice PS-5) and unit U-1009 (see point slice PS-6). Table 54 also indicates that other functions (e.g., F-0002, F-0003, Null, F-0098, etc.) have been applied to other units as illustrated.

Referring still to FIG. 2, interval column 60 includes intervals that correspond to each of the function and unit combinations in columns 56 and 58. For instance, point slice PS-1 indicates that average power function F-0001 has been applied to unit U-0002 on an hourly basis to generate average power for campus 12 (i.e., unit U-0002) for each hour during a corresponding time period. Similarly, point slice PS-6 indicates that average power for unit U-1009 has been determined on an hourly basis for a corresponding time period. Note that point slices PS-2, PS-3 and PS-4 each correspond to the same function (i.e., total energy consumption function F-0003) and the same unit (i.e., U-0023) but to different time intervals. For instance, slice PS-2 corresponds to hourly time intervals, slice PS-3 corresponds to daily intervals and slice PS-4 corresponds to monthly intervals. Thus, while slice PS-2 includes data values corresponding to hourly power consumption for unit U-0023, slices PS-3 and PS-4 include data values corresponding to daily and monthly power consumption for unit U-0023.

Time stamp column 62 includes time stamps indicating the times at which a corresponding function was applied to data to generate point slice values.

For example, with respect to point slice PS-1, column 62 indicates two hundred time stamps (only four time stamps shown). First time stamp T60 together with the corresponding interval (i.e., in this case, hourly) indicates two things. First, stamp T60 and the hourly interval indicate the beginning of a time period corresponding to point slice PS-1. In this case the beginning of the point slice time period is time T60 minus one hour (i.e., minus the interval period). Assuming each time stamp count corresponds to one minute, the beginning of the point slice time period is T1. Similarly, last time stamp T12,000 corresponding to point slice PS-1 indicates the end of the first point slice time periods. Second, stamp T60 indicates the time corresponding to a related stored data value. Consecutive stamps are equi-timed so that, for instance, time T120 follows time T60 by an interval equal to the point slice interval attribute, time T180 follows time T120 by the interval attribute and so on.

Referring still to FIG. 2, value column 63 includes a list of data values, one value corresponding to each of the time stamps in column 62. For instance, referring yet again to point slice PS-1, value V-1 includes a data value corresponding to the average power function (i.e., average power function F-0001) for campus 12 (i.e., unit 0002 is campus 12) over the hour preceding time T60. Value V-2 includes a similar value corresponding to the interval between times T60 and T120, value T180 includes a similar value corresponding to the interval between times T120 and T180 and so on.

Referring to FIGS. 1 and 2, among other software programs, workstation 50 runs a report requesting program that provides graphical user tools via interface 21, receives information including point slice attributes that can be used to identify one or more point slices required to instantiate a report, assembles the attributes into report requests useable by processor 51 and sends the report requests to processor 51 for further processing. To this end, the graphical user tools likely include user selectable graphical icons provided on a display screen. Selection may be via any manner known in the art. For instance, a mouse controlled pointer may be used to select icons, open menus, etc.

The user tools typically will step a system administrator through a process whereby the administrator selects each required point slice attribute. For instance, upon logging onto workstation 50 and accessing the report requesting program, the workstation 50 may instruct the user to specify a specific function to be performed on a data set to be identified. For example, one function may be average power while another function may be average temperature while yet one other function may be total energy consumption. To help the administrator select desired functions and also to restrict the administrator to selecting functions that are supported by database 52, preferably, the user tool lists supported function types in a drop down menu or as separately selectable icons. In a typical environment automation system, the number of separately supported functions will be no more than one-hundred but in other industries the number of supported functions may be many hundreds or even thousands.

After a function has been selected, workstation 50 prompts the administrator to select a unit to which the function is to be applied. To this end, workstation 50 may provide a series of questions formulated to guide the administrator to selecting a unit. For instance, a first question may require selection of an enterprise. Referring again to FIG. 1, each enterprise 11, 13 and 15 is assumed to be owned by a separate company (e.g., the first company owns enterprise 11). After selecting an enterprise, workstation 50 may provide a list of general unit categories such as "enterprise wide," "Campus," "Building," "Room," etc. and prompt the administer to select one of the categories. Assuming the building category is selected, station 50 may then prompt the user to identify the campus on which the building(s) is/are located including an option to select buildings on multiple campuses. After campuses are selected, station 50 next identifies each building on the selected campuses and facilitates selection of a subset of the buildings.

After the units (i.e., the buildings in the present example) have been selected, station 50 may next prompt the administrator to identify an interval over which the specified function should be applied to the selected units. Once again, this may be accomplished via either a pull down menu or selectable icons where exemplary intervals may include minute-by-minute, hourly, daily, monthly, quarterly, yearly, etc.

After an interval attribute has been specified, station 50 may prompt the administrator to select a time period to be divided by the specified intervals. These options, again, may be provided as a pull down menu or selectable icons.

After the time period is selected, station 50 may provide various viewing options corresponding to the attribute selections including, for instance, one or more table formats, pie-chart format, bar chart format, two or three axis graphical format, etc. While useful, in most cases this viewing format information will not be needed for database manipulation and is only needed to format data after retrieval has occurred and, for this reason, this formatting information will not be described here in detail.

During this report request specifying exercise, workstation 50 may limit attribute options as a function of previously specified attributes. For instance, where average power function 0001 is selected but a second campus does not include any source elements that generate data to which function 0001 can be applied, station 50 would not identify the second campus in subsequent queries related to function 0001.

Because the slice attributes are pre-specified, upon receiving the selected attributes, work station 50 can readily formulate a point slice request for database processor 51 including function, unit, interval and time period. Upon receiving the point slice request, processor 51 accesses existing point slice table 54 to determine whether or not the data required to instantiate a requested report exists within database 52. To this end, processor 51 analyzes the report request to identify the function, unit, interval and time period specified so that a particular point slice necessary to instantiate the report can be identified.

If a particular point slice exists that can be used to instantiate a report, processor 51 provides the point slice to workstation 50. Station 50 then formats the point slice data into a format consistent with the viewing selections (e.g., table, bar chart, pie chart etc.) chosen by the administrator and provides the report to the administrator via interface 21. For instance, if the administrator would like to retrieve average power for building 20 on a daily basis during the time period T1440 through T20,000, work station 50 determines that the required information is stored in point slice PS-3, retrieves point slice PS-3, selects the necessary information from point slice PS-3 (i.e., the information corresponding to time period T1440 through T20,000) and instantiates the requested report.

In the alternative, if there is no point slice stored in slice table 54 that satisfies a request, a new point slice must be generated or, an existing point slice having the same function, unit and interval attributes as the requested point slice, must be extended over a longer time period that includes the time period specified in the request.

According to the present invention, when a new point slice is generated to satisfy a report request, in addition to using the new point slice to instantiate the requested report, the new point slice is also stored in the existing point slice table 54 so that, if needed in the future to instantiate another report, the new point slice can be used again.

In addition, as a new point slice is generated, often intermediate point slices may be generated that may be used in the future to instantiate other report requests. For example, if a new report request requires the calculation of average daily power consumption over the course of a period from time T-1 through time T-500,000 on a monthly interval basis, intermediate average energy use values may be calculated on both a daily and an hourly interval basis over the time period T-1 through T-500,000 that can be stored as two additional point slices for subsequent use. Similarly, where average hourly power use is to be determined for a specific campus (e.g., the first campus 12), intermediate average power use values on an hourly basis may be determined for each of the building's on the first campus 12. These average hourly power use values for each of the buildings can then be stored as separate point slices, one slice for each building, for subsequent use. Many other intermediate point slices are contemplated.

Referring to FIGS. 1, 2 and 3, if a point slice necessary to instantiate a requested report is not present in the existing point slice table 54, processor 51 accesses point slice specifier 100. Specifier 100 includes three separate specifier tables including a unit table 102, a function table 106 and an interval dependency table 104. As the name implies, unit table 102 indicates a hierarchy of units within each enterprise 11, 13, 15, etc., data types corresponding to each of the source elements (i.e., sensors) within the units and specific unit numbers for each unit. To this end, unit table 102 includes three columns including a unit column 108, a data type column 110 and a unit number column 112. Unit column 108 lists the hierarchy of units. In the exemplary system considered here, enterprise A (see 11 in FIG. 1) is within a top level of the unit hierarchy and includes campuses 1, 2, etc. thereunder in a second hierarchical level. Similarly, campus 1 includes each of building-1 through building-20, building I includes room-1 through room-N, room-1 includes sensors S-0001 through S-XXX. In addition, as indicated, building-1 also includes power consumption sensor S-00A that measures the power delivered to building-1.

Data type column 110 includes an entry for each of the source elements or sensors in unit column 108. For example, data type DT0 corresponds to sensor S-00A, data type DT1 corresponds to sensor S-001, and so on. In the present example data type DT0 indicates that a corresponding source element generates power consumption data while other types (e.g., DT1, DT2, etc.) indicate other sensor types (e.g., temperature, humidity, etc.).

Unit column 112 includes a separate unit number for each unit in column 108. To this end, enterprise A is referred to as unit number U-0001, campus 1 is identified as unit number U-0002, and so on. Each unit number in column 112 can be used to identify all of the subunits corresponding to an associated unit in column 108. For instance, unit U-0001 that is associated with enterprise A includes all of the units hierarchally arranged (i.e., indented in FIG. 3) below enterprise A in column 108. Other unit table columns are contemplated that would facilitate grouping source elements along different lines. For instance, another column may include entries specifying specific utilities that provide power to specific units so that if desired, all units serviced by a particular utility could be grouped. As another instance, another column may include entries specifying units associated with specific customers. For instance, in a large office building there may be several hundred tenants and, by providing a customer column, units could be specified by tenant.

Function table 106 defines each of the functions supported by processor 51 and, to this end, includes a function column 114, a process column 116, a data types column 118 and a sub-functions column 120. Function column 114 lists each of the functions supported by processor 51. For instance, a first entry in column 114 includes average power function F-0001 a second entry includes function F-0002, and so on. Process column 116 actually identifies the data manipulation required to carry out the corresponding function in column 114. For instance, for average power function F-0001, process 116 may indicate that total power (i.e., power readings rolled up over an interval) should be divided by the number of hours in the interval to generate the average power use over the interval.

Data types column 118 indicates the type of data necessary to perform the process in column 116. Once again, for example, assuming a total energy consumption total energy consumption function F-0003, data type DT0 requires power consumption values. Note that by identifying a unit and a function, a specific subset of unit source elements is specified. For instance, where the total energy consumption function F0003 and unit building-1 are specified, because function F0003 only requires data types DT0 and building-1 only includes a single source element S-00A that generates data of type DT0, element S-00A has been uniquely specified. As another instance, where the total energy consumption F0003 and unit campus-1 are specified, the subset of elements corresponding to campus-1 that generate data of type DT0 have been specified.

Sub-functions column 120 includes a list of sub-functions useable to solve a corresponding process in column 116. For example, because function F-0003 is a total energy consumption function, the average power function F-0001 can use the results of total energy consumption function F-0003 to determine the average power over a specific interval. For this reason, total energy consumption function F-0003 is listed as a sub-function in column 120 of average power function F-0001.

Referring still to FIG. 3, some functions may not have corresponding data types listed in column 118 while other functions may not have corresponding sub-functions listed in column 120. For instance, average power average power function F-0001 corresponds to sub-function F0003 in column 120 but does not have a corresponding data type in column 118 while total energy consumption function F-0003 corresponds to data type DT0 in column 118 and lacks any corresponding sub-functions in column 120. Also, some functions may correspond to multiple data type (e.g., see function F-0002) where more than one type of data is required to solve the function or may correspond to several subfunctions (see function F-0004) where more than one sub-function is useful in solving the function.

Referring still to FIG. 3, interval dependency table 104 indicates a hierarchy of intervals including yearly, quarterly, monthly, daily, hourly and minuteby-minute.

An embodiment of the invention can be best understood by stepping through several examples of how processor 51 processes report requests provided via interface 21 and workstation 50. To this end, an initial identifier is illustrated in FIG. 2 and an amended identifier 54' that results from database modifications performed to generate a requested report is illustrated in FIG. 4.

Figure 4:
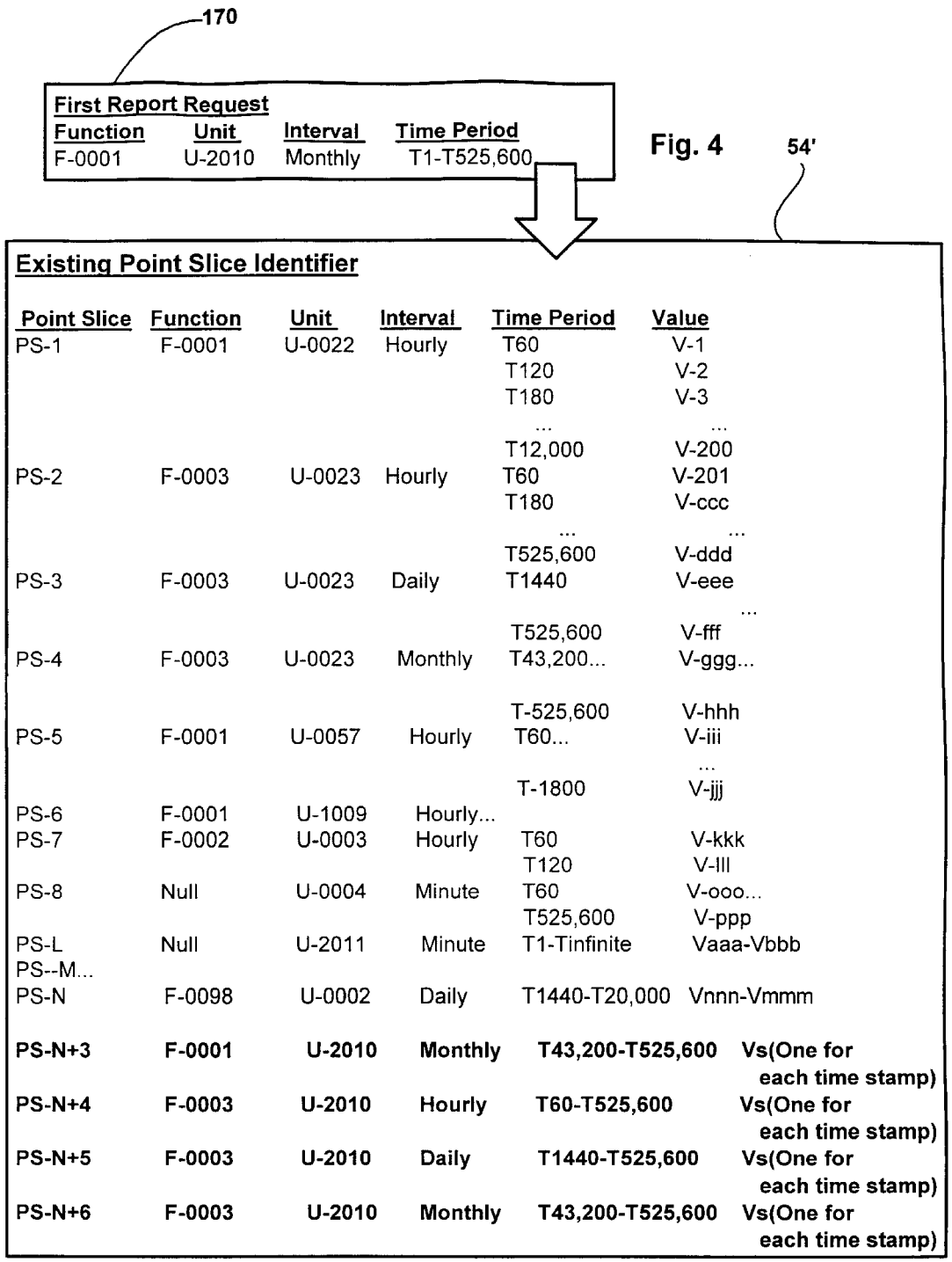
FIG. 4 is similar to FIG. 2, albeit also illustrating a first report request and a modified identifier.

Differences between initial and amended identifiers 54 and 54', respectively, are shown in bold face type in FIG. 4.

Figure 6:
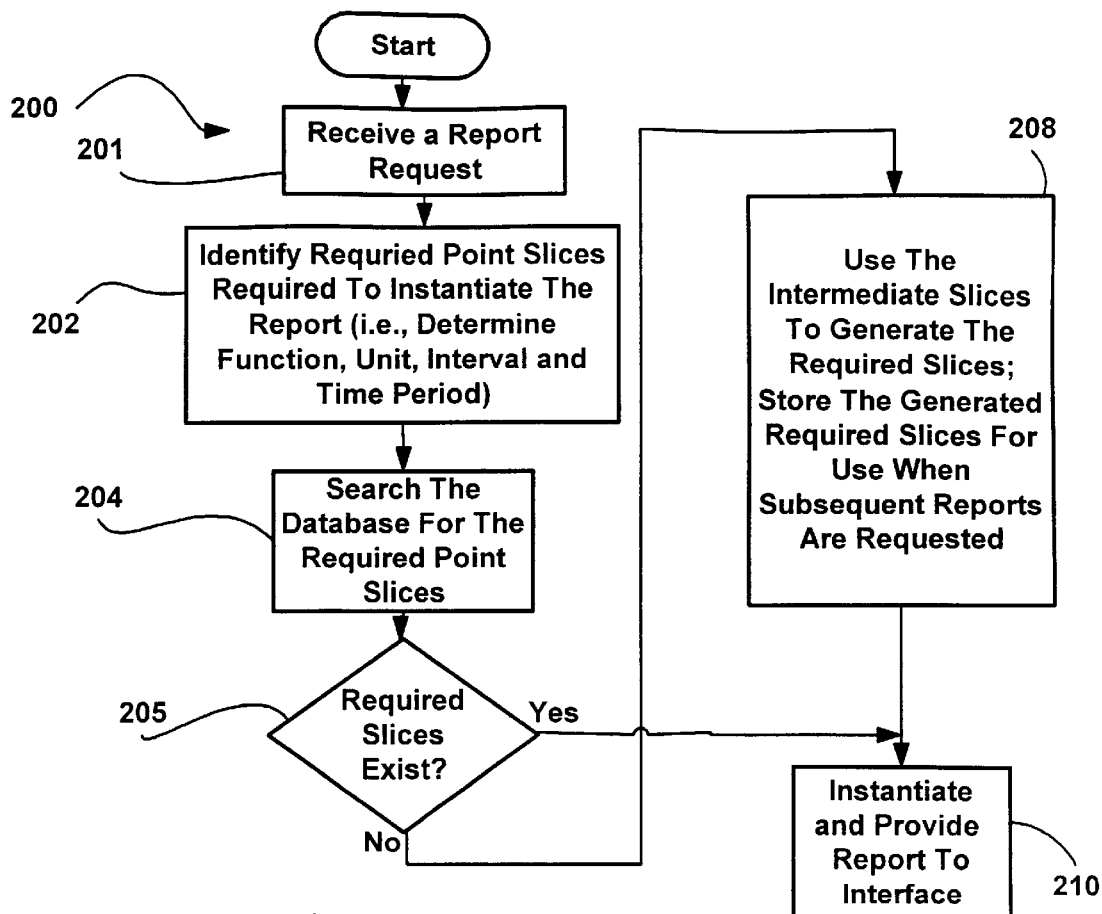
FIG. 6 is a flowchart illustrating a method performed by the processor and work station of FIG. 1.

Referring to FIG. 6, an exemplary method 200 according to the present invention is illustrated. At process block 201, a system administrator specifies a report request via interface 21. The report request, as described above, includes information that can be used to identify at least one point slice required to instantiate or provide the information necessary to generate the requested report. While each report request may include information that specifies more than one point slice, herein it will be assumed that, in order to simplify this explanation, each report request only specifies a single point slice.

To specify a point slice, the report request includes information that specifies a function, a unit, an interval and a time period. Referring also to FIG. 4, an exemplary first report request 170 indicates average power function F-0001, unit U-2010, a monthly interval and the time period T1–T525,600. Thus, consistent with the description above, the function is to provide average power. Referring also to FIG. 3, unit U-2010 corresponds to building-2 and therefore, the data provided by a subset of the sensors in building-2 is needed to instantiate the requested report. Specifically, referring to function table 106, the data types in column 118 that correspond to average power function F-0001 in column 114 include data type DT0 which corresponds to a power meter.

Referring still to FIG. 4, the first report request 170 interval is monthly indicating that the average power over the course of separate months is required to instantiate the report. The time period indicates times T1 through T525,600 where time T1 is the beginning of the time period and time T525,600 is the end of the time period over which the monthly power consumption averages should be provided. For the purpose of the present invention, it will be assumed that time T1 is Jan. 1, 1999 and time T525,600 is Dec. 31,1999 for a total of 12 monthly intervals.

Referring to FIGS. 1, 2, 3 and 6, at process block 202 processor 51 identifies a point slice needed to instantiate the requested report. To this end, processor 51 identifies the function, unit, interval and time period as specified in report request 170. Next, referring also to FIG. 2, processor 51 searches the data base 52 for the needed point slice at block 204. To this end, processor 51 accesses existing point slice table 54 and searches point slices within table 54 to determine whether or not the slice(s) specified by report request 170 already exist(s). At decision block 205, where point slices required to instantiate the requested report do exist within slice table 54, control passes to block 210 where processor 51 instantiates the requested report and provides the requested report to interface 21. Where the point slices required to instantiate the report request do not exist, at decision block 205, control passes to block 208 where processor 51 attempts to generate the needed point slices using other point slice data values existing within slice table 54.

Referring again to block 204, although many different methods for searching the data base for the required segments may be employed, according to an exemplary process, referring also to FIG. 2, processor 51 first identifies all point slices in table 54 corresponding to average power function F-0001. Next, processor 51 determines whether or not the average power function F-0001 has been performed for the unit specified in the report request 170. In this case, the specified unit is U-2010 (i.e., building-2). If average power function F-0001 had been completed for the report request unit, the next step in searching the database for the needed segments would be to determine whether or not the average power function F-0001 had been completed for the report request unit for the interval specified in the report request. If the function, unit and interval in the report request all match one of the point slices in the slice table 54, the final step is to determine whether or not the function has been applied over the course of the report request time period. If each of the function, unit, interval and time period corresponding to a point slice match the report request data, control passes to block 210.

Referring still to FIG. 2, in the present example, while there are units for which average power function F-0001 has been applied in slice table 54, average power function F-0001 has not been applied to the report request unit U-2010. Thus, in the present example, referring again to FIG. 6, control passes from block 205 to block 208. At block 208, processor 51 identifies intermediate point slices that include data segments required to generate the required point slices that do not exist. Next, processor 51 uses existing intermediate point slices to generate the nonexistent required point slices.

Continuing, at block 208, processor 51 stores both the newly generated point slices and any newly generated intermediate point slices for use in instantiating subsequent reports corresponding to subsequent report requests.

Referring again to FIG. 4, modified slice table 54' includes, among other newly created point slices, a newly created point slice PS-N+3 corresponding to average power function F-0001, for unit U-2010 over monthly intervals between the time period T-1 through T-525,600. In FIG. 4 newly created point slices, in addition to slice PS-N+3, include slices PS-N+4, PS-N+5 and PS-N+6, all of which are created and stored as a result of request 170 as will be described in more detail below. Referring still to FIG. 6, at process block 210, processor 51 instantiates and provides the requested report to the system administrator via interface 21.

It should be appreciated that, after the method 200 of FIG. 6 has been completed as described above, the next time any system administrator accesses database 52 and requests a report that requires data from any of point slices PS-N+3, PS-N+4, PS-N+5 or PS-N+6, the process of generating the data required to instantiate a report and provide the information to the administrator is greatly expedited as the data needed to instantiate the report is already included in the existing point slice table 54.

Referring still to FIGS. 1 and 6, as indicated above, at process block 208, processor 51 uses existing point slices to generate the nonexistent required point slices. In the above example, the nonexistent point slice comprises point slice PS-N+3 corresponding to average power average power function F-0001 for unit U-2010 (building-2) over monthly intervals between times T1 through T525,600.

Figure 7:
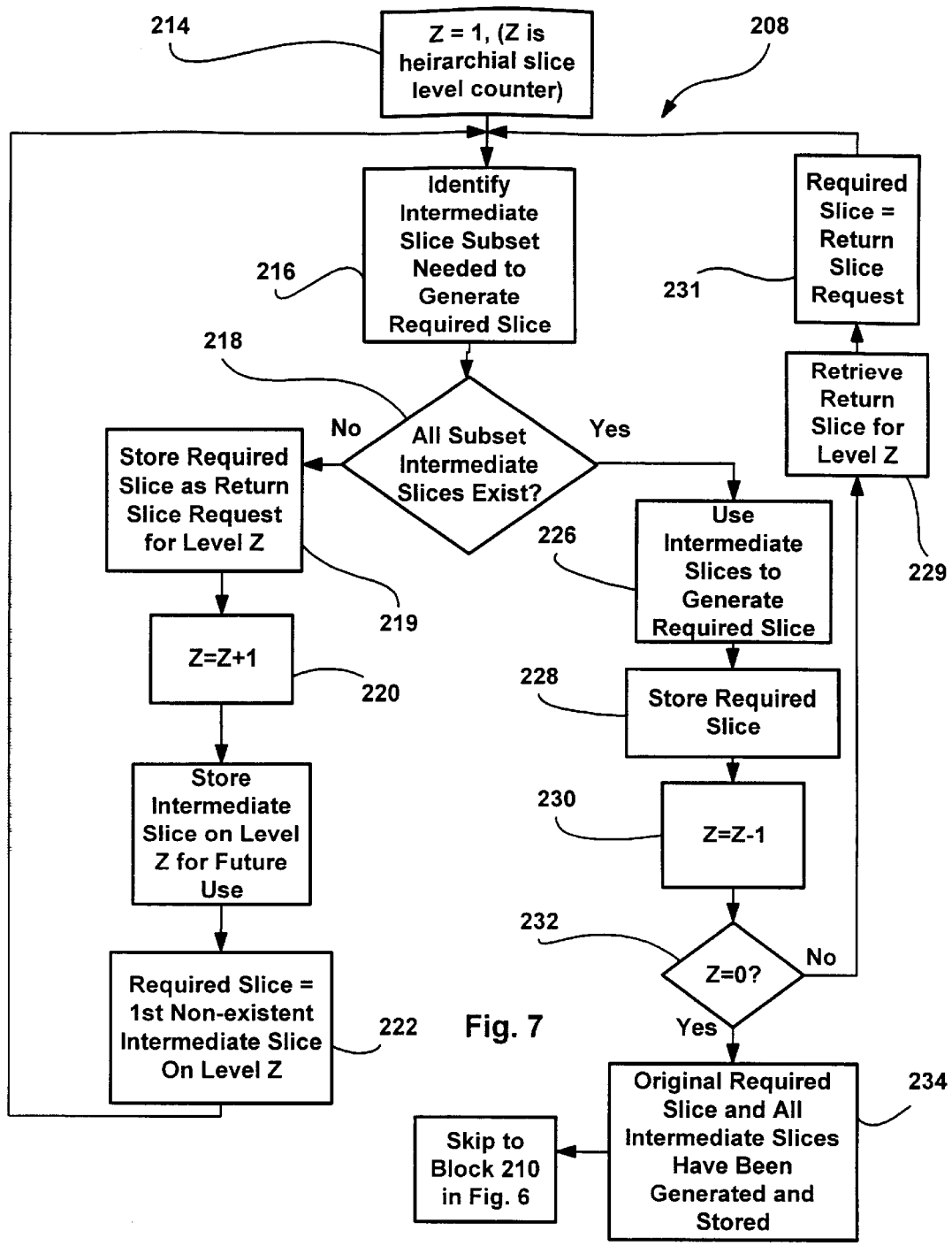
FIG. 7 is a flowchart illustrating a process corresponding to block 208 of FIG. 6.

Referring also to FIG. 7, an exemplary method 208 for generating nonexistent point slice PS-N+3 is illustrated. Generally, method 208 identifies intermediate point slices needed to generate the non-existent point slice required to instantiate a report, determines if the intermediate point slices exist, where the intermediate slices exist, processor 51 combines the intermediate slices to generate the required point slice, where one or more of the intermediate slices do not exist, processor 512 identifies other intermediate point slices that can be used to generate the non-existent intermediate slices, generates the needed intermediate slices and then combines the intermediate slices to provide the required slice.

To this end, at block 214 a flag variable Z is set which corresponds to an intermediate slice hierarchical counter. Flag Z tracks the number of point slice levels that processor 51 has to delve down into the database in order to generate a point slice required to instantiate a report. For instance, if a required slice is non-existent but intermediate slices exist that can be directly combined to generate the non-existent slices, flag Z remains a one indicating that only one level of point slices has to be used to generate the required slice. However, if, after identifying a first sub-set of intermediate slices that could be combined to generate a non-existent required slice, one or more of the first sub-set of slices is non-existent and therefore has to itself be generated using a second sub-set of intermediate slices, flag Z is incremented to two indicating that a second hierarchical level of intermediate slices has to be used to generate at least one of the first sub-set slices prior to combining the first sub-set of slices to generate the required slice. Further levels corresponding to larger Z values are contemplated and likely. Initially flag Z is set to one at block 214.

At block 216 processor 51 identified an intermediate slice subset including point slices needed to generate a non-existent required slice. Referring also to FIGS. 1 and 3, to identify the intermediate slice subset processor 51 first accesses function table 106 and locates average power function F-0001 (i.e., the function specified in report request 170) in function column 114. Next, processor 51 identifies data types and sub-functions corresponding to the request average power function F-0001 and located within columns 118 and 120, respectively. In the present example there is no data type listed for average power function F-0001 and the sub-function is F-0003 (i.e., the total energy consumption function).

Referring again to FIG. 2 and also to FIG. 7, after identifying subfunction F-0003, processor 51 recognizes that a point slice corresponding to total energy consumption function F-0003 could be used to generate the missing required slice (i.e., the total monthly power consumption values for building-2 over the period T1–T525,600 could be divided by the number of hours in each month to generate the average monthly power consumption values for building-2 over the same period needed to instantiate the requested report). The point slice corresponding to total energy consumption function F-0003, unit 2010, the monthly interval and time T1–T525,600 will be referred to hereinafter as slice PS-N+6. Slice PS-N+6 comprises the intermediate slice subset required to generate the required slice.

After slice PS-N+6 has been identified as an intermediate slice at block 216, control passes to block 218 where processor 51 determines if all intermediate subset slices exist. To this end, once again, processor 51 accesses identifier 52 (see FIG. 2) and searches for a point slice having total energy consumption function F-0003, unit U-2010, a monthly interval and a time period that includes times T1–T525,600. If the needed intermediate slice exists in identifier 54, control passes to block 226, where the intermediate slice is used to generate the required slice. In the present case this would be accomplished by multiplying the monthly power average values by hours in each month. Then, at block 228 the required slice is stored.

In the present case, initially, referring to FIG. 2, identifier 54 does not include the needed intermediate slice PS-N+6 and control passes to block 219 where the current required slice request is stored as a return slice request for the Zth level. In the present example Z is 1 at this point in the process so that slice request PS-N+3 is stored as the return slice request for the first level. Next, control passes to block 220 where flag Z is incremented by one indicating that a second hierarchical level of slices has to be accessed. In the present example Z is 2 at this point in the process.

Referring still to FIGS. 1, 2 and 7, at block 222 processor 51 relabels the first non-existent intermediate slice on the current intermediate level as a required slice. In the present example, slice PS-N+6 is the only intermediate slice and therefore slice PS-N+6 is labeled the required slice. Control then loops back up to block 216 where another intermediate slice subset that is needed to generate the required slice is identified. At this point the required slice is PS-N+6 having total energy consumption function F-0003. Once again, to identify the needed intermediate slices processor 51 accesses function table 106 in specifier 100 (see FIG. 3) and identifies the total energy consumption function F-0003 corresponding to the required slice and then identifies any corresponding data types and subfunctions.

In FIG. 3 data type DT0 (i.e., power consumption values) corresponds to total energy consumption function F-0003 while no sub-functions correspond to total energy consumption function F-0003. Next, processor 51 accesses interval dependency table 104 and identifies a sub-interval of the report request interval. In the present case the request interval is monthly and the subinterval in daily. Next, processor 51 forms a query for a point slice corresponding to total energy consumption function F-0003, unit U-2010, a daily interval and time period T1–T525,600, the query slice being the next intermediate slice subset needed to generate the required slice (i.e., slice PS-N+6). Hereinafter the query slice corresponding to the daily interval will be referred to as slice P-N+5.

After forming the query for slice PS-N+5 control passes to block 218 where processor 51 determines if slice PS-N+5 exists. Once again, referring to FIG. 2, slice PS-N+5 does not initially exist and control again passes to block 214 where the current required slice request is stored as a return slice request for the Zth level. Here, slice PS-N+6 is stored as the return slice request for the $2^{nd}$ level (i.e., Z=2). Next, control passes to black 220 where flag Z is incremented to 3 indicating that a third hierarchical level of slices has to be accessed. At block 222 non-existent intermediate slice PS-N+5 is relabeled a required slice and control loops back to block 216.

At block 216, processor 51 uses specifier 100 to identify yet another sub-set of intermediate slices needed to generate the current required slice (i.e., at this point the required slice being slice PS-N+5). To this end, processor 51 again accesses interval dependency table 104 and identifies a sub-interval of the daily interval. As illustrated in FIG. 3, the sub-interval of the daily interval is hourly. Next, processor 51 forms a query for a point slice corresponding to function F-3000, unit-2010, an hourly interval and period T1–T525, 600. Hereinafter this query slice corresponding to the hourly interval will be referred to as slice PS-N+4.

At block 218 processor 51 determines if slice PS-N+4 exists by searching identifier 54 (see FIG. 2). As illustrated, initially slice PS-N+4 does not exist and control again passes to block 214 where the current required slice request is stored as a return slice request for the Zth level. Here, slice PS-N+5 is stored as the return slice request for the $3^{rd}$ level (i.e., Z=3). Next, control passes to block 220 where Z is incremented to 4 indicating that a fourth hierarchical level of slices has to be accessed. At block 222 intermediate slice PS-N+4 is relabeled a current required point slice and control again loops up to block 216.

At block 216 processor 51 recognizes that the smallest interval supported by table 104 has been reached and next turns to unit table 102. Processor 51 uses table 102 to identify specific source elements that provide data of a type required by the function corresponding to the current required slice. As indicated above (see above and also columns 114 and 118 in FIG. 3), the data type required to perform total energy consumption function F-0003 is type DT0 (i.e., power consumption values) and therefore processor 51 searches for elements hierarchically arranged under building-2 (i.e., unit U-2010 that was specified in the report request 170) that generate data type DT0. As illustrated element S-00A corresponding to unit U-2011 generates data type DT0.

Thus, at block 216 processor 51 forms yet another point slice query specifying a slice corresponding to a "Null" function (i.e., simply a data store function), unit U-2011, a minute-by-minute interval and period T1–T525,600. The slice corresponding to this query is referred to herein as slice PS-L.

Next, at block 218, processor 51 determines if intermediate slice PS-L exists in identifier 54. As illustrated in FIG. 2, slice PS-L does exist in identifier 54 so control passes to block 226. At block 226 at least a sub-set of the data segments in slice PS-L are rolled up to generate total hourly power consumption for unit U-2010 over the period T1–T525,600 to generate the current required slice PSN+4. At block 228 the newly generated current required slice PS-N+4 including a separate time stamped data value for each hour during the period T1–T525,600 is stored. Referring also to FIG. 4, modified slice identifier 54' includes slice PS-N+4.

At block 230 flag Z is decremented by one indicating a return to the next higher hierarchical level of point slices. At block 232 flag Z is compared to zero. Where flag Z=0, the original required slice (i.e., PS-N+3) has been provided and control would kick out of process 208 and to block 210 in FIG. 6. In the present case, at this point in the exemplary process Z is equal to 3 and therefore control passes to block 229 in FIG. 7.

At block 229 processor 51 retrieves the return slice request for the Zth hierarchical slice level. In the present example, at this stage in the process, the Zth level is level 3 and the return slice request is for point slice PS-N+5 corresponding to daily power consumption for unit U-2010 for period T1 through T525,600. At block 231 the return request PS-N+5 is relabeled the required slice and control passer back up to block 216.

At block 216, processor 51 again uses specifier 100 to identify all intermediate slices needed to generate the required slice PS-N+5. Again, the only intermediate slice needed to generate required slice is PS-N+4. At block 218 processor 51 determines if slice PS-N+4 exists in identifier 54'. At this point slice PS-N+4 would exist in the identifier (i.e., slice PS-N+4 was just added to the identifier—see FIG. 4) and therefore control passes to block 226.

At block 226 processor 51 uses intermediate slice PS-N+4 to generate required slice PS-N+5. To this end, the hourly power consumption values in slice PS-N+4 are rolled up into daily total energy consumption values over period T1 through T525,600. Each daily value is time stamped with a specific time corresponding to an associated day and the values are then stored at block 228 as point slice PS-N+5 (See FIG. 4).

Next, at block 230 flag Z is decremented to value 2 and at block 232 flag Z is compared to zero. Here, because flag Z is greater than zero control passes back to block 229. At block 229 processor 51 retrieves the return slice request for the second (i.e., Z=2) hierarchical slice level. In the example the return request for the second level is PS-N+6 corresponding to monthly power consumption for unit U-2010 for period T1 through T525,600. At block 231 return request PS-N+6 is relabeled the required slice and control passes back up to block 216.

At block 216 processor 51 again uses specifier 100 to identify all intermediate slices needed to generate required slice PS-N+6. Again, the only intermediate slice needed to generate required slice PS-N+6 is slice PS-N+5. At block 218 processor 51 determines if slice PS-N+5 exists in the identifier. At this point in the process slice PS-N+5 exists in the identifier and therefore control passes to block 226.

At block 226 processor 51 uses intermediate slice PS-N+5 to generate required slice PS-N+6. To this and, the daily power consumption values in slice PS-N+5 are rolled up into monthly total energy consumption values over period T1 through T525,600. Each monthly value is time stamped with a specific time corresponding to an associated month and the values are then stored at block 228 as point slice PS-N+6 (see FIG. 4).

Next, at block 230, flag Z is decremented by 1 to value 1 and at block 232 flag Z is again compared to zero. Because flag Z is greater than zero control passes to block 229. At block 229 processor 51 retrieves the return slice request for the first (i.e., Z=1) hierarchical slice level. In the example the return request for the first level is PS-N+3 corresponding to monthly average power for unit U-2010 for period T1 through T525,600. At block 231 return request PS-N+3 is relabeled the required slice and control passes back up to block 216.

At block 216 processor 51 uses specifier 100 to identify all intermediate slices needed to generate required slice PS-N+3. Again, the only intermediate slice needed to generate required slice PS-N+3 is slice PS-N+6. At block 218 processor 51 determines if slice PS-N+6 exists. At this point in the exemplary process slice PS-N+6 exists in identifier 54' and therefore control passes to block 226.

At block 226 processor 51 uses intermediate slice PS-N+6 to generate required slice PS-N+3. To this end, the monthly total energy consumption values in slice PS-N+6 are divided by the number of hours in each month over the period T1 through T525,600 to generate average monthly power consumption in watts/hour for period T1 through T525,600. Each average monthly value is time stamped and the values are then stored at block 228 as point slice PS-N+3 (see FIG. 4).

Next, at block 230, flag Z is decremented by 1 to value 0 and at block 232 flag Z is compared to zero. Because flag Z is zero, control passes to block 234. Block 234 is not functional but instead simply indicates that the original required slice PS-N+3 and all intermediate slices related thereto have been generated and stored. Control jumps from block 234 back to block 210 in FIG. 6 where processor 51 instantiates the required report and provides the report to the system user.

Referring again to FIG. 4, it should be appreciated that after first report request 170 has been processed, four new point slices have been generated including point slice PS-N+3 required to instantiate the requested report. The additional intermediate slices include point slices PS-N+4, PS-N+5 and PS-N+6, all of which were needed to generate point slice PS-N+3 data values. Subsequent to storing slices PS-N+3 through PS-N+6, any report request requiring data corresponding to any of the four new point slices can be processed extremely quickly and, in some cases, seemingly in real time.

Figure 5:
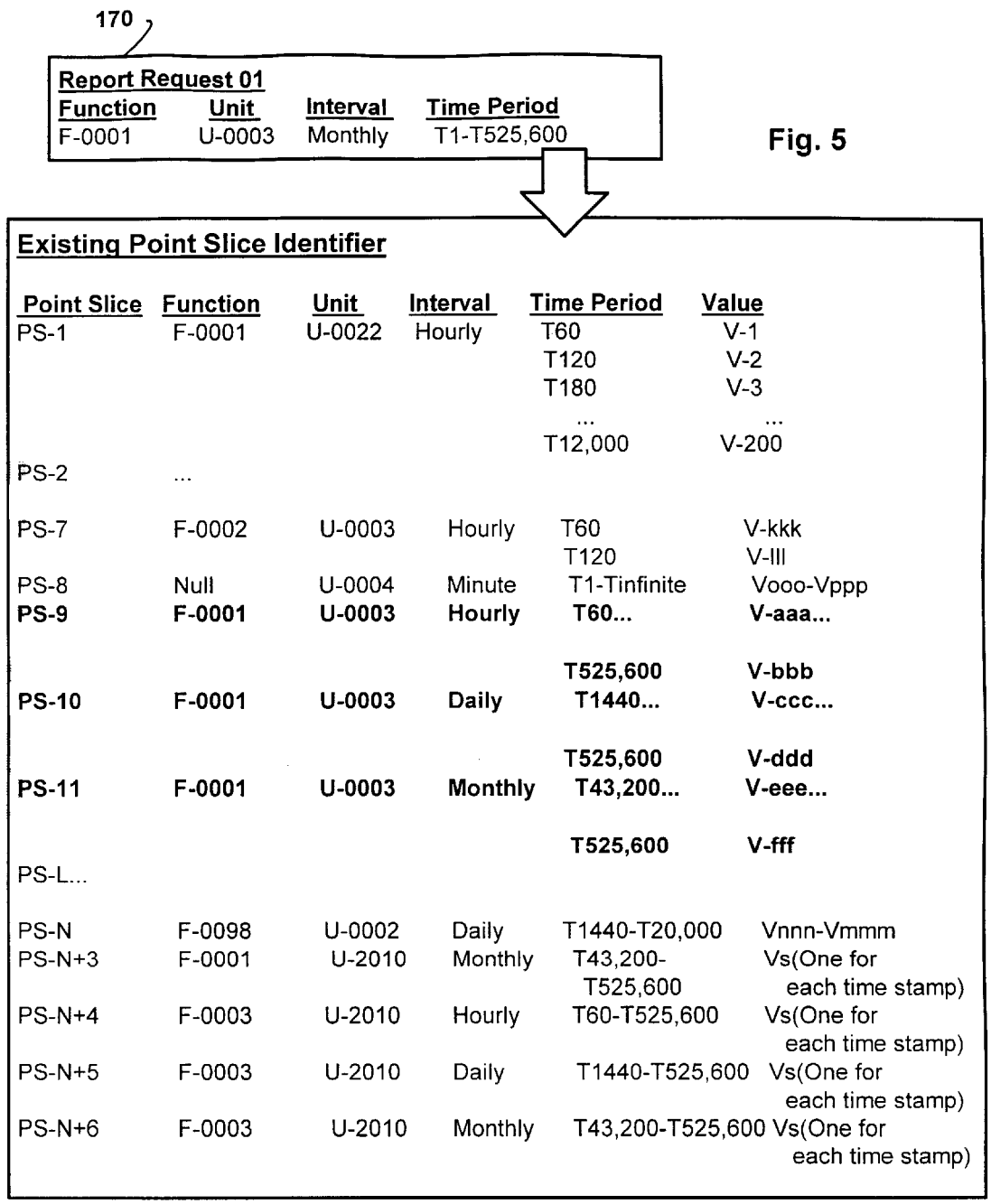
FIG. 5 is similar to FIG. 2, albeit also illustrating a second report request and a modified identifier.

Referring now to FIGS. 4 and 5, FIG. 5 illustrates a second report request 300 and a corresponding modified slice identifier 54" that results when request 300 is applied to the identifier 54' of FIG. 4. Some of the point slices in FIG. 5 that would be unaffected by processing of request 300 have been compressed (i.e., eliminated from the Figure) so that changes to the identifier can be observed more easily. Differences between initial and modified identifiers 54' and 54", respectively, are bolded in FIG. 5.

Report request 300 specifies total energy consumption (i.e., total energy consumption function F-0003) for building 1 (i.e., unit U-0003, see also FIG. 3) for monthly intervals over a three year period T1 through T1,576,800. Referring also to FIG. 6, upon receiving request 300 at block 201, processor 51 identifies the point slice defined by request 300. Hereinafter, the slice defined by request 300 will be referred to as PS-11. Referring to FIG. 4, slice PS-11 corresponding to total energy consumption function F-0003, unit-0003 and the monthly interval does not exist and therefore, control passes from block 202 through blocks 204 and 205 to block 208.

At block 208 the process illustrated in FIG. 7 commences. After drilling down through the point slice identifier information, eventually processor 51 identifies a required point slice PS-9' corresponding to total energy consumption function F-0003 for unit U-0003 for hourly intervals over period T1 through T1,576,800. Referring again to FIG. 4, while there is no point slice PS-9' that includes all of the data values required, point slice PS-9 includes relevant values for period T1 through T525,600 (i.e., for a sub-period of period T1–T1,576,800). Thus, consistent with the process of FIG. 7, processor 51 drops yet another slice level to identify a point slice that can be used to generate the data values needed to generate slice PS-9' that are not provided in slice PS-9. In this case, referring again to FIG. 3, processor 51 identifies a slice PS-8 as illustrated in FIG. 4.

Using slice PS-8 processor 51 generates the additional values needed to complete slice PS-9' and adds the additional values to existing slice PS-9 to generate modified slice PS-9'. Thus, processor 51 rolls up the minute-by-minute data from slice PS-8 over the course of period T525,601 through T1,576,800 for hourly intervals to generate the additional values (i.e., the values not included in existing slice PS-9 but needed to generate slice PS-9') and then combines the additional values with existing slice PS-9 to generate slice PS-9'.

Next, in a manner similar to that described above with respect to request 170, processor 51 combines slice PS-9' values to generate slice PS-10 and combines slice PS-10 values to generate slice PS-11. Upon generating each of the intermediate slices processor 51 stores the new slices for subsequent use.

Thereafter, slice PS-11 is used to instantiate the requested report that is provided to the system user via interface 21.

According to another aspect of the present invention, if a request requires a non-existent point slice but a slice exists that includes the same function, unit and interval as the required non-existent slice, according to at least one inventive embodiment, in addition to generating and storing the required slice, processor 51 also generates data corresponding to the required slice function, unit and interval for the time period between the existing slice period and the required slice period and then stores all of the values having the same function, unit and interval as a single point slice. While not necessary to facilitate the most general inventive embodiment, it has been determined that this simple process appreciably increases the simplicity of the resulting database and the algorithm required to access stored data.

Figure 8:
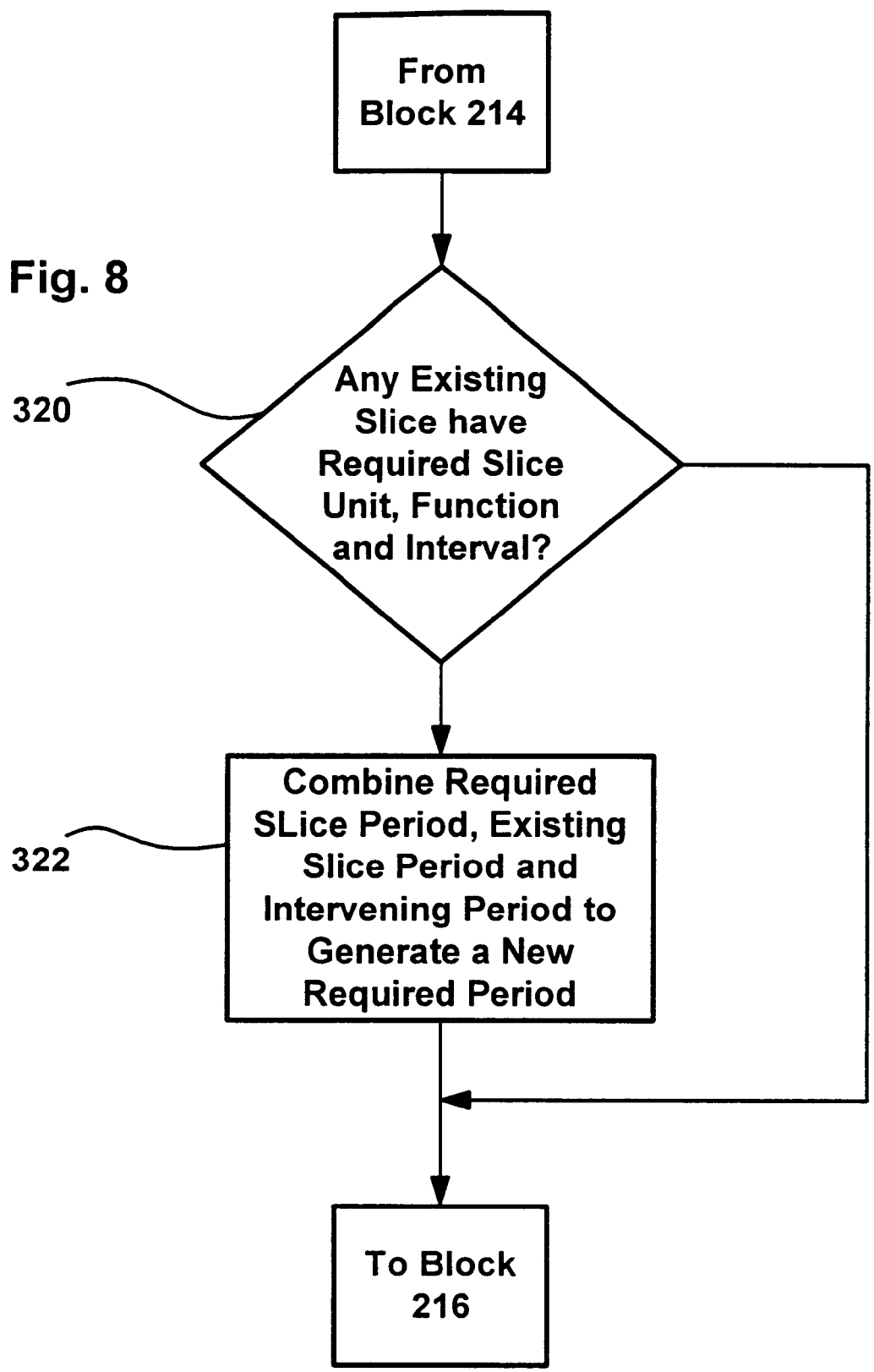
FIG. 8 is a block diagram illustrating a submethod which may be included in the method of FIG. 7.

Referring again to FIG. 7 and also to FIG. 8, to implement this "filling in" database management concept, two additional blocks 320 and 322 may be added to process 208 just prior to block 216 (i.e., each of the return arrows from blocks 222 and 231 return to block 320 and block 322 flows into block 216). Thus, after flag Z is set to one at block 214, at block 320 processor 51 determines whether or not any existing slice in identifier 54 has the required slice function, unit and interval. Where no existing slice has the required slice function, unit and interval control passes directly to block 216 and control is as indicated above.

However, where any slice is characterized by the required slice function, unit and interval, control passes to block 322. At block 322 processor 51 combines the required slice period, the period of the existing slice that has the same function, unit and interval as the required slice and any intervening period to generate a new required slice period. Thereafter control passes to block 216 and control continues as described above. After the required point slice and intervening slices are generated and stored, while one or more of the newly generated slices will include data values corresponding to time outside the period specified by the system user, processor 51 will only use data from the slice necessary to instantiate the report requested.

An example of how this database management concept may operate is instructive. To this end, assume that the identifier of FIG. 2 currently exists and that a report request requires a point slice corresponding to total energy consumption function F-0003 for unit U-0023 for hourly intervals for the period T1,051,200 through T1,576,800. According to the process described above with respect to FIGS. 7 and 8, upon searching for the required point slice, when processor 51 control reaches block 320, processor 51 identifies point slice PS-2 as having the same function (i.e., F-0003), unit (i.e., U-0023) and interval (i.e., hourly) as the required slice. Thus, control passes to block 322 where processor combines the required slice period T1,051,200 through T1,576,800, the existing slice period T1 through T525,600 (i.e., the period corresponding to slice PS-2) and the intervening period T525,601 through T1,051,199 to generate a new required slice period between times T1 and T1,576,800. Thereafter control passes to block 216 in FIG. 7 where intermediate slices needed to generate the required slice for entire period T1 through T1,576,800 are identified. In this case, after passing through FIG. 7 an amended identifier includes an amended slice PS-2' (not illustrated) corresponding to total energy consumption function F-0003, unit U-0023, an hourly interval and the period T1 through T1,576,800. The requested report only required data for period T1,051,200 through T1,576,800 and therefore, upon instantiating the report, data from only this period is used. Nevertheless, after processing the request data from the complete point slice PS-2' is available for future use.

It should be understood that the methods and apparatuses described above are only exemplary and do not limit the scope of the invention, and that various modifications could be made by those skilled in the art that would fall under the scope of the invention. For example, as indicated above, while unit table 102 in FIG. 3 lists units hierarchically with respect to physical relationships (i.e., campus includes buildings, buildings include rooms, etc.), other unit tables may correlate units differently or in additional ways. For instance, table 102 may include an additional column such as a utility column (not illustrated) that indicates which of several different utilities provide power to particular units. For example, while enterprise A in table 102 may be owned by a single company, the different campuses campus-1, campus-2, etc., may be serviced by different utilities. In this case, a utility identifier may be placed in the utilities column indicating the specific utility and then point slice units could be identified according to utility (e.g., average power for buildings serviced by a specific utility for a specific period and set intervals).

As another instance, in the case of a hosting business where a hosting company provides computing or data warehousing services to many companies, table 102 may include a client or customer column including a customer indicator for each unit. In this case a report unit comprising all of the facilities (e.g., source elements) corresponding to a particular customer could be identified in a request or in a point slice by indicating the customer indicator. One other column breakdown for units may be by geographic location. Similarly, combinations of columns may be used to specify other unit groups such as all customers in a particular four state region serviced by a single utility.

In addition, while the invention has been described in the context of only two functions (i.e., average power and total energy consumption), many other functions are contemplated. For instance, other functions may include flow rate, average rate, maximum rate, minimum rate, time of maximum rate, time of minimum rate, etc.) temperature averages, means, etc., pressure averages and means, etc., and more complex functions.

Moreover, while the invention has been described in the context of the enterprise automation industry, clearly the invention is applicable in many other industries where massive amounts of data have to be stored, accessed and manipulated.

Furthermore, while point slices have been characterized by way of four separate attributes including function, unit, interval and time period above, other attributes may also be used to characterize slices. For instance, units of measure may be used to distinguish similar slices. For example, one slice may include Fahrenheit temperature values while a similar may include Celsius temperature values.

In addition, as indicated above, while some user queries may require only a single point slice, other queries may require two or more point slices where the ultimate report provides various types of information. For example, one query may require total energy consumption data values, average power data values, peak power, peak time and load factor values for a plurality of times during an extended period. In this case a separate slice may be required for each value type.

Moreover, while not necessary, the interface may be programmed to support various types of partially pre-canned reports. For instance, one partially pre-canned report may be entitled "Load Profile Report" and include times, consumption, average power, peak power, peak time and load factor values. In this case report type selection would constitute specification of several functions, one function for each value type. Thereafter the interval, unit and time period attributes would still have to be specified by the user prior to performing the slice search, generation, storage and report instantiation.

To apprise the public of the scope of this invention, the following claims are made.

What is claimed is:

1. A method to be used with a database and an interface, the interface for specifying reports to be generated, the database capable of including a hierarchy of point slices where each point slice includes a data segment and at least a subset of the data segments can be combined to instantiate each specified report, the method for expediting the report generating process and comprising the steps of:

(a) receiving a report request;

(b) identifying at least one required point slice required to instantiate the report;

(c) searching the database for the at least one required point slice;

(d) where the at least one required point slice does not exist, identifying an intermediate subset that includes intermediate point slices required to generate the at least one required point slice;

(e) determining if the intermediate subset point slices exist;

(f) for each non-existent intermediate subset point slice, using existing point slices to generate the non-existent intermediate point slice;

(g) combining the intermediate subset point slices to generate the at least one required point slice; and (h) instantiating the report using the at least one required point slice.

2. The method of claim 1 further including the step of, after generating the non-existent required point slice, storing the generated required point slice for use when subsequent reports are requested.

3. The method of claim 1 further including the step of, after generating the non-existent intermediate subset point slices, storing the generated intermediate subset point slices for use when subsequent reports are requested.

4. The method of claim 1 wherein the step of using the existing segments to generate the non-existing intermediate subset point slices includes, for each non-existing intermediate subset point slice, repeating steps (c) through (g) with the intermediate point slice as the required point slice to determine the intermediate point slice.

5. The method of claim 4 wherein at least a subset of the generated intermediate subset point slices are stored for subsequent use.

6. The method of claim 4 wherein every generated intermediate subset point slice is stored for subsequent use.

7. The method of claim 1 wherein the step of identifying at least one required point slice needed to instantiate the report includes receiving a report request and parsing the report request to identify the at least one point slice.

8. The method of claim 7 for use in an enterprise automation system including at least one unit, the unit including at least one data source element and wherein each point slice includes data corresponding to a specific function, a specific period and specific intervals within the period for a specific unit and wherein the step of receiving includes receiving an indication of a particular unit, a time period for which to report data corresponding to the unit, an interval and a function to be performed on data corresponding to the unit, the step of identifying including identifying a point slice corresponding to the specified unit, function, time period and interval.

9. The method of claim 8 wherein the step of identifying further includes identifying relevant data types required to perform the specified function, identifying relevant unit source elements that provide the relevant data types and identifying relevant point slices corresponding to the relevant units, interval, time period and 5 function.

10. The method of claim 9 wherein the step of combining the point slices includes combining data segments corresponding to the relevant units according to the specified function.

11. A method to be used with a database and an interface, the interface for specifying reports to be generated, the database capable of storing a hierarchy of points slices where each point slice corresponds to a data segment and where a subset of the data segments can be combined to instantiate each specified report, the method for automatically modifying a database structure as a function of specified reports to speed subsequent report generation and comprising the steps of:

(a) receiving a report request;
(b) identifying at least one required point slice needed to instantiate the report;
(c) searching the database for the at least one required point slice;
(d) where the at least one required point slice does not exist, identifying an intermediate subset that includes intermediate point slices required to generate the at least one required point slice;
(e) determining if the intermediate subset point slices exist;
(f) for each non-existent intermediate subset point slice, using existing point slices to generate the non-existent intermediate subset point slice;
(g) combining the intermediate subset point slices to generate the at least one required point slice; and
(h) storing the at least one required point slice for use when subsequent reports are requested.

12. The method of claim 11 wherein the step of using the existing point slices to generate the non-existing intermediate subset point slices includes, for each non-existent intermediate subset point slice, repeating steps (c) through (g) with the intermediate point slice as the required point slice to determine the intermediate point slice.

13. The method of claim 12 further including storing every generated point slice for subsequent use.

14. A database for use with a processor, an interface and a plurality of source elements, the interface for specifying report requests, each report request including request information that can be used to identify point slices and corresponding data values where a sub-set of the data values are needed to instantiate each report, the source elements periodically generating raw data values and providing the raw data values to the processor, the processor for receiving data values and report requests, combining the data values to generate combined data values as a function of the report requests and storing the data values in corresponding point slices for subsequent use in generating subsequent reports pursuant to subsequent requests and generating reports using the data values, the database comprising:

an existing point slice identifier identifying existing point slices; and
a point slice specifier indicating how to combine existing data values to generate non-existing data values and corresponding point slices.

15. The database of claim 14 wherein each combined data value may include data from more than one source element and each point slice is characterized by unit, period, interval and function attributes, the unit attribute indicating the source elements that produce signals used to generate the data values, the period attribute indicating a period to which the slice corresponds, the interval attribute indicating a duration between data values in the point slice and the function attribute indicating a function applied to at least one of source element signals and data values to generate the data values in the point slice, the existing point slice identifier indicating each of the function, unit, interval and period corresponding to each existing point slice.

16. The database of claim 15 wherein each request includes a unit attribute and wherein the specifier, for at least some of the units, indicates sub-units that comprise the units.

17. The database of claim 15 wherein each request includes a function attribute and wherein the specifier, for at least some of the functions, indicates sub-functions that comprise the functions.

18. The database of claim 15 wherein each request includes a period attribute and wherein the specifier, for at least some of the periods, indicates sub-periods that comprise the periods.

19. The database of claim 15 wherein each request includes an interval attribute and wherein the specifier, for at least some of the intervals, indicates sub-intervals that comprise the intervals.

20. The database of claim 15 for use in managing a building automation system and wherein the unit attribute is selected from one of a customer unit, a supplier unit, a geographic region unit, a person unit, a campus unit, a building unit, a floor unit and an equipment unit.

21. The database of claim 15 for use in managing a building automation system and wherein the interval attribute is selected from one of a yearly interval, a quarterly interval, a monthly interval, a daily interval, an hourly interval and a minute by minute interval.

22. The database of claim 15 wherein, for at least some point slices, the specifier indicates other point slices to be manipulated according to a function to generate a requested point slice.

23. The database of claim 15 wherein each request also includes a unit attribute and the point slice specifier correlates the unit attributes with specific sub-sets of source elements.

24. A method to be used with a database where a plurality of data segments are stored in the database, at least some of the data segments correlated with point slices in the database, the method for expediting the process of accessing combinations of the data segments upon request and comprising the steps of:

receiving a report request;
identifying at least one required point slice required to instantiate the requested report;
if the at least one required point slice does not exist, identifying intermediate point slices that can be combined to provide the required point slice;
combining the intermediate point slices to generate the required point slice;
during the step of combining the intermediate point slices, determining if the combining process generates intermediate point slices that may be useful during subsequent requests; and where there are useful intermediate point slices, storing the useful intermediate point slices for subsequent use.

25. The method of claim 24 further including the step of storing the generated required point slice.

26. The method of claim 24 wherein the report request includes a function attribute specifying a function to be performed to generate the data segment corresponding to a point slice needed to instantiate the requested report and where the function includes at least one sub-function, the combining step including solving the sub-function and the step of determining including identifying the data segment and intermediate point slice corresponding to the solution of the sub-function.

27. The method of claim 24 wherein the report request includes a unit attribute specifying source elements from which data segments are to be combined to generate the point slice needed to instantiate the requested report and wherein the unit includes at least two sub-units, the combining step including combining the data elements for each of the two sub-units separately and the step of determining including identifying the data segments and intermediate point slices corresponding to each of the two sub-units.

28. The method of claim 24 wherein the report request includes an interval attribute specifying an interval over which data segments are to be combined to generate the point slice needed to instantiate the requested report and wherein the interval includes at least first and second sub-intervals, the combining step including combining the data segments for each of the first and second sub-intervals separately and the step of determining including identifying the data segments and intermediate point slices corresponding to each of the first and second sub-intervals.

29. A method to be used with a database where a plurality of data segments are stored in the database, at least some of the data segments correlated with point slices in the database, the method for expediting the process of accessing combinations of the data segments upon request and comprising the steps of:

receiving a report request including a first time period over which data having a first set of attributes is needed to instantiate the requested report;

determining if there is an existing first point slice having the first set of attributes over a second time period where the first time period includes at least a time segment in addition to the second time period;

where the first point slice exists, generating a second point slice having the first set of attributes and including data corresponding to a new period including the first and second periods and any intervening period.

30. The method of claim 29 further including the step of storing the second point slice.

31. The method of claim 30 further including the step of deleting the first point slice.

32. The method of claim 30 further including the step of using the second point slice data values to instantiate the requested report.

33. The method of claim 32 further including the step of presenting the instantiated report to a requesting system user.

34. The method of claim 29 wherein the first time period overlaps the second time period.

35. The method of claim 29 wherein the first time period includes the second time period.

36. A database construct for storing data values corresponding to specific source elements, the construct comprising:

a plurality of point slices wherein each point slice includes at least one data value, each slice correlated with unit, function, interval and time period attributes, the unit attribute indicating the source elements that produce raw data used to generate corresponding point slice data values, the period attribute indicating a period to which the slice corresponds, the interval attribute indicating a duration between data values in the point slice and the function attribute indicating a function applied to data values to generate the point slice data values.

37. The construct of claim 36 wherein at least some of the functions are Null meaning that the function is simply to store a raw data value generated by a source element.

38. The apparatus of claim 37 wherein to perform the step of using the existing segments to generate the non-existing intermediate subset point slices, the program further causes the processor to perform the steps of, for each non-existing intermediate subset point slice, repeating steps (c) through (g) with the intermediate point slice as the required point slice to determine the intermediate point slice.

39. The apparatus of claim 38 wherein at least a subset of the generated intermediate subset point slices are stored for subsequent use.

40. The apparatus of claim 38 wherein every generated intermediate subset point slice is stored for subsequent use.

41. An apparatus to be used with a database and an interface, the interface for specifying reports to be generated, the database capable of including a hierarchy of point slices where each point slice includes a data segment and at least a subset of the data segments can be combined to instantiate each specified report, the apparatus for expediting the report generating process and comprising:

a processor running a pulse sequencing program to perform the steps of:
(a) receiving a report request;
(b) identifying at least one required point slice required to instantiate the report;
(c) searching the database for the at least one required point slice;
(d) where the at least one required point slice does not exist, identifying an intermediate subset that includes intermediate point slices required to generate the at least one required point slice;
(e) determining if the intermediate subset point slices exist;
(f) for each non-existent intermediate subset point slice, using existing point slices to generate the non-existent intermediate point slice;
(g) combining the intermediate subset point slices to generate the at least one required point slice; and
(h) instantiating the report using the at least one required point slice.

42. The apparatus of claim 41 wherein the program further causes the processor to perform the step of, after generating the non-existent required point slice, storing the generated required point slice for use when subsequent reports are requested.

43. The apparatus of claim 41 wherein the program further causes the processor to perform the step of, after generating the non-existent intermediate subset point slices, storing the generated intermediate subset point slices for use when subsequent reports are requested.

44. The apparatus of claim 41 wherein, to perform the step of identifying at least one required point slice needed to instantiate the report, the program further causes the processor to perform the steps of receiving a report request and parsing the report request to identify the at least one point slice.

45. The apparatus of claim 44 for use in an enterprise automation system including at least one unit, the unit including at least one data source element and wherein each point slice includes data corresponding to a specific function, a specific period and specific intervals within the period for a specific unit and wherein, to perform the step of receiving the program causes the processor to perform the step of receiving an indication of a particular unit, a time period for which to report data corresponding to the unit, an interval and a function to be performed on data corresponding to the unit and wherein, to perform the step of identifying the program causes the processor to perform the step of identifying a point slice corresponding to the specified unit, function, time period and interval.

46. The apparatus of claim 45 wherein to perform the step of identifying the program further causes the processor to perform the steps of identifying relevant data types required to perform the specified function, identifying relevant unit source elements that provide the relevant data types and identifying relevant point slices corresponding to the relevant units, interval, time period and function.

47. The apparatus of claim 46 wherein, to perform the step of combining the point slices the program causes the processor to perform the step of combining data segments corresponding to the relevant units according to the specified function.

48. An apparatus to be used with a database and an interface, the interface for specifying reports to be generated, the database capable of storing a hierarchy of points slices where each point slice corresponds to a data segment and where a subset of the data segments can be combined to instantiate each specified report, the apparatus for automatically modifying a database structure as a function of specified reports to speed subsequent report generation and comprising:

a processor running a pulse sequencing program to perform the steps of:
(a) receiving a report request;
(b) identifying at least one required point slice needed to instantiate the report;
(c) searching the database for the at least one required point slice;
(d) where the at least one required point slice does not exist, identifying an intermediate subset that includes intermediate point slices required to generate the at least one required point slice;
(e) determining if the intermediate subset point slices exist;
(f) for each non-existent intermediate subset point slice, using existing point slices to generate the non-existent intermediate subset point slice;
(g) combining the intermediate subset point slices to generate the at least one required point slice; and
(h) storing the at least one required point slice.

49. The apparatus of claim 48 wherein the step of using the existing point slices to generate the non-existing intermediate subset point slices includes, for each non-existing intermediate subset point slice, repeating steps (c) through (g) with the intermediate point slice as the required point slice to determine the intermediate point slice.

50. The apparatus of claim 49 wherein the program further causes the processor to perform the step of storing every generated point slice for subsequent use.

51. An apparatus to be used with a database where a plurality of data segments are stored in the database, at least some of the data segments correlated with point slices in the database, the apparatus for expediting the process of accessing combinations of the data segments upon request and comprising the steps of:

receiving a report request;
identifying at least one required point slice required to instantiate the requested report;
if the at least one required point slice does not exist, identifying intermediate point slices that can be combined to provide the required point slice;
combining the intermediate point slices to generate the required point slice;
during the step of combining the intermediate point slices, determining if the combining process generates intermediate point slices that may be useful during subsequent requests; and
where there are useful intermediate point slices, storing the useful intermediate point slices for subsequent use.

52. The apparatus of claim 51 wherein the program further causes the processor to perform the step of storing the generated required point slice.

53. The apparatus of claim 51 wherein the report request includes a function attribute specifying a function to be performed to generate the data segment corresponding to a point slice needed to instantiate the requested report and where the function includes at least one sub-function, wherein, to perform the combining step, the program causes the processor to perform the step of solving the sub-function and wherein, to perform the step of determining the program causes the processor to perform the step of identifying the data segment and intermediate point slice corresponding to the solution of the sub-function.

54. The apparatus of claim 51 wherein the report request includes a unit attribute specifying source elements from which data segments are to be combined to generate the point slice needed to instantiate the requested report and wherein the unit includes at least two sub-units, wherein, to perform the combining step, the program causes the processor to perform the step of combining the data elements for each of the two sub-units separately and wherein, to perform the step of determining the program causes the processor to perform the step of identifying the data segments and intermediate point slices corresponding to each of the two sub-units.

55. The apparatus of claim 51 wherein the report request includes an interval attribute specifying an interval over which data segments are to be combined to generate the point slice needed to instantiate the requested report and wherein the interval includes at least first and second sub-intervals, wherein, to perform the combining step the program causes the processor to perform the step of combining the data segments for each of the first and second sub-intervals separately and wherein to perform the step of determining the program causes the processor to perform the step of identifying the data segments and intermediate point slices corresponding to each of the first and second sub-intervals.

56. An apparatus to be used with a database where a plurality of data segments are stored in the database, at least some of the data segments correlated with point slices in the database, the apparatus for expediting the process of accessing combinations of the data segments upon request and comprising:

a processor running a pulse sequencing program to perform the steps of:
receiving a report request including a first time period over which data having a first set of attributes is needed to instantiate the requested report;

determining if there is an existing first point slice having the first set of attributes over a second time period where the first time period includes at least a time segment in addition to the second time period; and where the first point slice exists, generating a second point slice having the first set of attributes and including data corresponding to a new period including the first and second periods and any intervening period.

57. The apparatus of claim 56 wherein the program further causes the processor to perform the step of storing the second point slice.

58. The apparatus of claim 57 wherein the program further causes the processor to perform the step of deleting the first point slice.

59. The apparatus of claim 57 wherein the program further causes the processor to perform the step of using the second point slice data values to instantiate the requested report.

60. The apparatus of claim 59 wherein the program further causes the processor to perform the step of presenting the instantiated report to a requesting system user.

61. The apparatus of claim 56 wherein the first time period overlaps the second time period.

62. The apparatus of claim 56 wherein the first time period includes the second time period.

63. An apparatus to be used with a database and an interface, the interface for specifying reports to be generated, the database capable of including a hierarchy of point slices where each point slice includes a data segment and at least a subset of the data segments can be combined to instantiate each specified report, the apparatus for expediting the report generating process and comprising:
   (a) means for receiving a report request;
   (b) means for identifying at least one required point slice required to instantiate the report;
   (c) means for searching the database for the at least one required point slice;
   (d) where the at least one required point slice does not exist, means for identifying an intermediate subset that includes intermediate point slices required to generate the at least one required point slice;
   (e) means for determining if the intermediate subset point slices exist;
   (f) for each non-existent intermediate subset point slice, means for using existing point slices to generate the non-existent intermediate point slice;
   (g) means for combining the intermediate subset point slices to generate the at least one required point slice; and
   (h) means for instantiating the report using the at least one required point slice.

64. The apparatus of claim 63 further including means for, after generating the non-existent required point slice, storing the generated required point slice for use when subsequent reports are requested.

65. The apparatus of claim 63 further including means for, after generating the non-existent intermediate subset point slices, storing the generated intermediate subset point slices for use when subsequent reports are requested.

66. The apparatus of claim 63 wherein the means for using the existing segments to generate the non-existing intermediate subset point slices includes, for each non-existing intermediate subset point slice, means for causing means (c) through (g) to operate with the intermediate point slice as the required point slice to determine the intermediate point slice.

67. The apparatus of claim 66 wherein at least a subset of the generated intermediate subset point slices are stored for subsequent use.

68. The apparatus of claim 6 wherein every generated intermediate subset point slice is stored for subsequent use.

69. The apparatus of claim 63 wherein the means for identifying at least one required point slice needed to instantiate the report includes means for receiving a report request and parsing the report request to identify the at least one point slice.

70. The apparatus of claim 69 for use in an enterprise automation system including at least one unit, the unit including at least one data source element and wherein each point slice includes data corresponding to a specific function, a specific period and specific intervals within the period for a specific unit and wherein the means for receiving includes means for receiving an indication of a particular unit, a time period for which to report data corresponding to the unit, an interval and a function to be performed on data corresponding to the unit, the means for identifying including means for identifying a point slice corresponding to the specified unit, function, time period and interval.

71. The apparatus of claim 70 wherein the means for identifying further includes means for identifying relevant data types required to perform the specified function, means for identifying relevant unit source elements that provide the relevant data types and means for identifying relevant point slices corresponding to the relevant units, interval, time period and function.

72. The apparatus of claim 71 wherein the means for combining the point slices includes means for combining data segments corresponding to the relevant units according to the specified function.

73. An apparatus to be used with a database and an interface, the interface for specifying reports to be generated, the database capable of storing a hierarchy of points slices where each point slice corresponds to a data segment and where a subset of the data segments can be combined to instantiate each specified report, the apparatus for automatically modifying a database structure as a function of specified reports to speed subsequent report generation and comprising:
   (a) means for receiving a report request;
   (b) means for identifying at least one required point slice needed to instantiate the report;
   (c) means for searching the database for the at least one required point slice
   (d) means for where the at least one required point slice does not exist, identifying an intermediate subset that includes intermediate point slices required to generate the at least one required point slice;
   (e) means for determining if the intermediate subset point slices exist;
   (f) means for each non-existent intermediate subset point slice, using existing point slices to generate the non-existent intermediate subset point slice;
   (g) means for combining the intermediate subset point slices to generate the at least one required point slice; and
   (h) means for storing the at least one required point slice.

74. The apparatus of claim 73 wherein the step of using the existing point slices to generate the non-existing intermediate subset point slices includes, for each non-existing intermediate subset point slice, repeating steps (c) through (g) with the intermediate point slice as the required point slice to determine the intermediate point slice.

75. The apparatus of claim 74 further including storing every generated point slice for subsequent use.

76. An apparatus to be used with a database where a plurality of data segments are stored in the database, at least some of the data segments correlated with point slices in the database, the apparatus for expediting the process of accessing combinations of the data segments upon request and comprising:

means for receiving a report request;

means for identifying at least one required point slice required to instantiate the requested report;

means for if the at least one required point slice does not exist, identifying intermediate point slices that can be combined to provide the required point slice;

means for combining the intermediate point slices to generate the required point slice;

means for during the step of combining the intermediate point slices, determining if the combining process generates intermediate point slices that may be useful during subsequent requests; and where there are useful intermediate point slices, means for storing the useful intermediate point slices for subsequent use.

77. The apparatus of claim 76 further including means for storing the generated required point slice.

78. The apparatus of claim 76 wherein the report request includes a function attribute specifying a function to be performed to generate the data segment corresponding to a point slice needed to instantiate the requested report and where the function includes at least one sub-function, the means for combining including means for solving the sub-function and the means for determining including means for identifying the data segment and intermediate point slice corresponding to the solution of the sub-function.

79. The apparatus of claim 76 wherein the report request includes a unit attribute specifying source elements from which data segments are to be combined to generate the point slice needed to instantiate the requested report and wherein the unit includes at least two sub-units, the means for combining including means for combining the data elements for each of the two sub-units separately and the means for determining including means for identifying the data segments and intermediate point slices corresponding to each of the two sub-units.

80. The apparatus of claim 76 wherein the report request includes an interval attribute specifying an interval over which data segments are to be combined to generate the point slice needed to instantiate the requested report and wherein the interval includes at least first and second sub-intervals, the means for combining including means for combining the data segments for each of the first and second sub-intervals separately and the means for determining including means for identifying the data segments and intermediate point slices corresponding to each of the first and second sub-intervals.

81. An apparatus to be used with a database where a plurality of data segments are stored in the database, at least some of the data segments correlated with point slices in the database, the apparatus for expediting the process of accessing combinations of the data segments upon request and comprising:

means for receiving a report request including a first time period over which data having a first set of attributes is needed to instantiate the requested report;

means for determining if there is an existing first point slice having the first set of attributes over a second time period where the first time period includes at least a time segment in addition to the second time period;

where the first point slice exists, means for generating a second point slice having the first set of attributes and including data corresponding to a new period including the first and second periods and any intervening period.

82. The apparatus of claim 81 further including means for storing the second point slice.

83. The apparatus of claim 82 further including means for deleting the first point slice.

84. The apparatus of claim 82 further including means for using the second point slice data values to instantiate the requested report.

85. The apparatus of claim 84 further including means for presenting the instantiated report to a requesting system user.

86. The apparatus of claim 81 wherein the first time period overlaps the second time period.

87. The apparatus of claim 81 wherein the first time period includes the second time period.

\* \* \* \* \*